United States Patent
Kitagawa et al.

(10) Patent No.: US 10,551,540 B2
(45) Date of Patent: Feb. 4, 2020

(54) SEPARATOR-ATTACHED ADHESIVE LAYER STRUCTURE AND PRODUCTION METHOD THEREFOR, SEPARATOR-ATTACHED ADHESIVE LAYER AND POLARIZING FILM COMBINATION STRUCTURE AND PRODUCTION METHOD THEREFOR, AND IMAGE DISPLAY DEVICE

(71) Applicant: NITTO DENKO CORPORATION, Ibaraki-shi, Osaka (JP)

(72) Inventors: Takeharu Kitagawa, Ibaraki (JP); Yuki Kida, Ibaraki (JP); Shinsuke Akizuki, Ibaraki (JP); Atsushi Yasui, Ibaraki (JP); Yusuke Toyama, Ibaraki (JP); Takaaki Ishii, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 14/900,568

(22) PCT Filed: Jun. 20, 2014

(86) PCT No.: PCT/JP2014/066443
§ 371 (c)(1),
(2) Date: Dec. 21, 2015

(87) PCT Pub. No.: WO2014/203995
PCT Pub. Date: Dec. 24, 2014

(65) Prior Publication Data
US 2016/0161652 A1    Jun. 9, 2016

(30) Foreign Application Priority Data
Jun. 21, 2013    (JP) .................... 2013-130464

(51) Int. Cl.
*C09J 133/06* (2006.01)
*C09J 5/06* (2006.01)
(Continued)

(52) U.S. Cl.
CPC .............. *G02B 5/3033* (2013.01); *B32B 7/12* (2013.01); *C08L 33/06* (2013.01); *C09J 5/06* (2013.01);
(Continued)

(58) Field of Classification Search
None
See application file for complete search history.

(56) References Cited

U.S. PATENT DOCUMENTS

| | | |
|---|---|---|
| 2001/0041763 A1 | 11/2001 | Suzuki et al. |
| 2006/0121273 A1 | 6/2006 | Toyama et al. |

(Continued)

FOREIGN PATENT DOCUMENTS

| | | |
|---|---|---|
| JP | 2002030264 A | 1/2002 |
| JP | 2003049143 A | 2/2003 |

(Continued)

OTHER PUBLICATIONS

International Search Report for PCT/JP2014/066443 dated Sep. 16, 2014.

(Continued)

*Primary Examiner* — Frank D Ducheneaux
(74) *Attorney, Agent, or Firm* — Hauptman Ham, LLP

(57) ABSTRACT

Provided are a separator-attached adhesive layer structure which comprises a separator having moderate light peelability with respect to an adhesive layer and exhibits excellent processability and durability, and a production method therefor. The production method comprises: a first step of forming a layer of an adhesive composition containing a (meth)acryl-based polymer, a peroxide and a phenolic antioxidant, on a release treatment surface of a separator sub- (Continued)

jected to a release treatment; and a second step of, after completion of the first step, heating the adhesive composition to cause cross-linking therein so as to be formed as an adhesive layer.

10 Claims, 2 Drawing Sheets

(51) Int. Cl.
    *C09J 7/38*     (2018.01)
    *C09J 7/40*     (2018.01)
    *C09J 7/22*     (2018.01)
    *C08L 33/06*     (2006.01)
    *C08K 5/13*     (2006.01)
    *C08K 5/14*     (2006.01)
    *G02B 5/30*     (2006.01)
    *B32B 7/12*     (2006.01)
    *C09J 7/10*     (2018.01)
    *G02F 1/1335*     (2006.01)
    *C08K 5/00*     (2006.01)

(52) U.S. Cl.
    CPC . *C09J 7/10* (2018.01); *C09J 7/22* (2018.01); *C09J 7/38* (2018.01); *C09J 133/06* (2013.01); *G02B 5/305* (2013.01); *G02F 1/133528* (2013.01); *B32B 2307/42* (2013.01); *B32B 2307/734* (2013.01); *B32B 2457/202* (2013.01); *C08K 5/005* (2013.01); *C08K 5/13* (2013.01); *C08K 5/14* (2013.01); *C09J 2201/606* (2013.01); *C09J 2203/318* (2013.01); *C09J 2205/102* (2013.01); *C09J 2433/00* (2013.01)

(56) References Cited

U.S. PATENT DOCUMENTS

| | | |
|---|---|---|
| 2008/0143894 A1 | 6/2008 | Oohira et al. |
| 2009/0042004 A1 | 2/2009 | Yano et al. |
| 2009/0104450 A1 | 4/2009 | Inoue et al. |
| 2012/0108734 A1 | 5/2012 | Ogawa et al. |
| 2012/0121824 A1 | 5/2012 | Toyama et al. |
| 2013/0288048 A1 | 10/2013 | Toyama et al. |
| 2014/0272200 A1* | 9/2014 | Akizuki ............ G02F 1/133528 428/1.54 |
| 2014/0377550 A1* | 12/2014 | Yasui ..................... C09J 7/385 428/354 |
| 2015/0070603 A1* | 3/2015 | Yamasaki ............ C09J 133/08 349/12 |

FOREIGN PATENT DOCUMENTS

| | | |
|---|---|---|
| JP | 2006183022 A | 7/2006 |
| JP | 3822213 B2 | 9/2006 |
| JP | 2006299257 A | 11/2006 |
| JP | 2007138147 A | 6/2007 |
| JP | 2008174595 A | 7/2008 |
| JP | 2008176270 A | 7/2008 |
| JP | 2009120805 A | 6/2009 |
| JP | 2012097162 A | 5/2012 |
| JP | 2012140579 A | 7/2012 |
| WO | 2010126054 A1 | 11/2010 |

* cited by examiner

SEPARATOR-ATTACHED ADHESIVE LAYER STRUCTURE AND PRODUCTION METHOD THEREFOR, SEPARATOR-ATTACHED ADHESIVE LAYER AND POLARIZING FILM COMBINATION STRUCTURE AND PRODUCTION METHOD THEREFOR, AND IMAGE DISPLAY DEVICE

TECHNICAL FIELD

The present invention relates to a separator-attached adhesive layer structure and a production method therefor, and a separator-attached adhesive layer and polarizing film combination structure and a production method therefor. The present invention also relates to an image display device, such as a liquid crystal display device, an organic EL display device or a PDP device, using the separator-attached adhesive layer and polarizing film combination structure.

BACKGROUND ART

In an image display device and the like, an image-forming scheme thereof essentially requires disposing a polarizing element on each of opposite sides of a liquid crystal cell. Generally, a polarizing film is attached thereto. When the polarizing film is attached to the liquid crystal cell, an adhesive is commonly used. As regards bonding between the polarizing film and the liquid crystal cell, respective materials thereof are generally bonded closely together through the adhesive so as to reduce light loss. In this case, an adhesive is employed because it has a merit such as being able to achieve fixing of the polarizing film without any need for a drying process. Typically, an adhesive is used in the form of an adhesive layer and polarizing film combination structure in which it is preliminarily provided as an adhesive layer on one surface of a polarizing film.

Meanwhile, late years, in an image display device for mobile applications such as a mobile phone, an entire display module thereof tends to be reduced in thickness and weight more and more, particularly, from aesthetic performance and portability. A polarizing film for use in the image display device also needs to be further reduced in thickness and weight. On the other hand, an image display device is increasingly used in various environments such as an outdoor or harsh environment, and is therefore sought to have higher durability than before. Because of the above circumstances, there is a need for a thinned polarizing film having excellent optical properties, and it is also necessary to develop an adhesive layer applicable to such a thinned polarizing film.

In a process for attaching a polarizing film to a liquid crystal cell, first of all, a separator (release film) laminated to a surface of the polarizing film through an adhesive layer is peeled off to expose the adhesive layer, and then the polarizing film is laminated to a liquid crystal display panel. In this process, it is common to, in a state in which the polarizing film is suckingly held on a surface of a stage, attach a peeling tape to a surface of the separator (release film) at one end thereof, and pull the peeling tape toward the other end of the separator to thereby peel off the separator from the polarizing film.

With a view to enhancement in durability and others, it is often the case that a cross-linking agent is added to an adhesive composition for forming the adhesive, e.g., together with a (meth)acryl-based polymer. For example, the following Patent Document 1 describes an adhesive which contains a peroxide and an isocyanate-based compound, in addition to a (meth)acryl-based polymer. In the following Patent Document 2 also describes an adhesive which contains a peroxide and an isocyanate-based cross-linking agent, in addition to a (meth)acryl-based polymer containing a (meth)acryl-based monomer and a nitrogen-containing monomer. The Patent Document 3 describes a method of producing a silicone-coated release liner-attached adhesive layer. The method comprises: a first step of providing a layer of an adhesive composition containing a (meth)acryl-based polymer serving as a base polymer and a peroxide, on a release treatment surface (surface subjected to a release treatment) of a silicone-coated release liner; and a second step of, after completion of the first step, thermally decomposing a part or an entirety of the peroxide to adjust a peel force of the silicone-coated release liner.

CITATION LIST

Patent Document

Patent Document 1: JP 2006-183022A
Patent Document 2: JP 2007-138147A
Patent Document 3: JP 3822213B

SUMMARY OF INVENTION

Technical Problem

As described in the Patent Documents 1 to 3, in the case where a peroxide is added as a cross-linking agent to an adhesive composition for forming an adhesive layer, cross-linking is progressed in a curing step after forming a layer of the adhesive composition on a separator or the like and then subjecting the layer to drying. This provides an advantage of being able to shorten an aging period of time. On the other hand, the use of a peroxide leads to a significant increase in peel force of the separator with respect to the adhesive layer during an operation of peeling off the separator from a polarizing film, thereby not only causing difficulty in peeling off the separator but also possibly causing the occurrence of a problem such as peeling or ripped-out of the adhesive layer from the polarizing film. In particular, the possibility of the occurrence of such a problem becomes higher in the case where, as such a polarizing film, a type having a relatively small thickness is used. Specifically, in the case where, as such a polarizing film, a type having a relatively small thickness is used, the possibility of the occurrence of lifting or peeling of the polarizing film becomes higher, in addition to the possibility of peeling of the adhesive layer from the polarizing film. On the other hand, if the peel force of the separator with respect to the adhesive layer is excessively low, lifting of the separator with respect to the adhesive layer is likely to occur.

Thus, there is a need for a separator-attached adhesive layer structure production method capable of, in the case where a peroxide is added as a cross-linking agent to an adhesive layer-forming adhesive composition, imparting moderate light peelability (light releasability) to the separator.

It is an object of the present invention to provide a separator-attached adhesive layer structure which comprises a separator having moderate light peelability with respect to an adhesive layer and exhibits excellent processability and durability, and a production method therefor.

It is another object of the present invention to provide: a separator-attached adhesive layer and polarizing film combination structure (hereinafter also referred to simply as "adhesive layer and polarizing film combination structure") comprising the separator-attached adhesive layer structure; and an image display device using the adhesive layer and polarizing film combination structure and a production method therefor.

Solution to Technical Problem

As a result of continuing a diligent study to solve the above problems, the inventors of this application found that a peel force of a separator with respect to an adhesive layer can be moderately adjusted by adding a phenolic antioxidant as a separator peel force adjuster, together with a peroxide, to an adhesive layer-forming adhesive composition. The inventors also found that the addition of the phenolic antioxidant to the adhesive layer-forming adhesive composition makes it possible to (1) prevent main chain break in a (meth)acryl-based polymer due to oxidation degradation which would otherwise occur in an edge region of the adhesive layer, and (2) allow an adhesive to exert a sufficient adhesive force in the edge region of the adhesive layer, even in a situation where a contraction deformation force strongly acts on a polarizer and/or a transparent protective film. Consequently, the inventors found that, by making the adhesive layer contain the phenolic antioxidant, it becomes possible to prevent the occurrence of abnormality in external appearance of an edge region of an adhesive layer and polarizing film combination structure, thereby enhancing durability thereof. The present invention has been obtained as a result of the above diligent researches, and has the following features.

Specifically, the present invention relates to a method of producing a separator-attached adhesive layer structure. The method comprises: a first step of forming a layer of an adhesive composition containing a (meth)acryl-based polymer, a peroxide and a phenolic antioxidant, on a release treatment surface of a separator subjected to a release treatment; and a second step of, after completion of the first step, heating the adhesive composition to cause cross-linking therein so as to be formed as an adhesive layer.

Preferably, in the method of the present invention, the separator-attached adhesive layer structure contains the phenolic antioxidant in an amount of 0.05 to 3 weight parts, with respect to 100 weight parts of the (meth)acryl-based polymer.

Preferably, in the method of the present invention, the separator-attached adhesive layer structure contains the peroxide in an amount of 0.05 to 2 weight parts, with respect to 100 weight parts of the (meth)acryl-based polymer.

Preferably, in the method of the present invention, the (meth)acryl-based polymer contains, as a monomer unit, an alkyl (meth)acrylate and a hydroxyl group-containing monomer.

Preferably, in the method of the present invention, the (meth)acryl-based polymer has a weight-average molecular weight of 500,000 to 3,000,000.

Preferably, in the method of the present invention, the separator-attached adhesive layer structure further contains a silane coupling agent in an amount of 0.001 to 5 weight parts, with respect to 100 weight parts of the (meth)acryl-based polymer.

Preferably, in the method of the present invention, the second step includes heating the adhesive composition at a temperature of 70 to 170° C. for 30 to 240 seconds to cause cross-linking therein.

The present invention also relates to a separator-attached adhesive layer structure produced by the above method.

Preferably in the separator-attached adhesive layer structure of the present invention, the separator-attached adhesive layer structure has a gel fraction of 45 to 95 weight %.

Preferably in the separator-attached adhesive layer structure of the present invention, a peel force of the separator with respect to the adhesive layer is 0.05 to 0.30 N/50 mm-width.

The present invention further relates to a method of producing a separator-attached adhesive layer and polarizing film combination structure. This combination structure production method comprises laminating a separator-attached adhesive layer structure to at least one surface of a polarizing film comprising a polarizer and a transparent protective film attached to at least one surface of the polarizer, through a surface of an adhesive layer of the separator-attached adhesive layer structure, wherein the separator-attached adhesive layer structure is composed of the aforementioned separator-attached adhesive layer structure.

Preferably, in the combination structure production method of the present invention, a total thickness of the polarizing film is 100 μm or less.

Further, the present invention relates to a separator-attached adhesive layer and polarizing film combination structure produced by the above combination structure production method, and an image display device using the above separator-attached adhesive layer and polarizing film combination structure in a number of at least one.

Effect of Invention

In the separator-attached adhesive layer structure production method of the present invention, a phenolic antioxidant is added as a separator peel force adjuster to an adhesive layer-forming adhesive composition, together with a (meth)acryl-based polymer and a peroxide, and the resulting composition is subjected to heating and cross-linking so as to be formed as an adhesive layer. This makes it possible to produce a separator-attached adhesive layer structure in which a peel force of a separator with respect to an adhesive layer is moderately adjusted. In addition, the phenolic antioxidant is added to the adhesive layer-forming adhesive composition, together with the (meth)acryl-based polymer and the peroxide, so that a gel fraction of the adhesive layer can be increased since an early stage of production. Therefore, it becomes possible to produce a separator-attached adhesive layer structure having excellent processability.

As mentioned above, particularly in the case where, as the polarizing film, a type having a relatively thin thickness is used, an excessively high peel force of the separator with respect to the adhesive layer causes difficulty in peeling off the separator, and a higher possibility of the occurrence of a problem such as peeling or ripped-out of the adhesive layer from the polarizing film. However, in the separator-attached adhesive layer structure production method of the present invention, the peel force of the separator with respect to the adhesive layer is moderately adjusted by a synergistic effect between the peroxide and the phenolic antioxidant. Thus, when a separator-attached adhesive layer and polarizing film combination structure, particularly, a separator-attached adhesive layer and polarizing film combination structure comprising a polarizing film having a total thickness of 100 μm or less, is produced using the separator-attached adhesive layer structure produced by the separator-attached adhesive layer structure production method of the present invention, the produced separator-attached adhesive layer and polarizing film combination structure can comprise a separator having moderate light peelability with respect to an adhesive layer and exhibit excellent processability.

A step of peeling the separator from the polarizing film is generally performed in, but not limited to, a state in which the polarizing film is fixed to a suction fixing device. The suction fixing device comprises a suction stage having a plurality of suction ports for sucking air therethrough by a vacuum pump or the like, wherein it is operable to fix an target object placed on the stage by means of an air suction force (suction holding force). In a typical peel step, a surface of the polarizing film on a side opposite to the separator is placed on a surface of the suction stage of the suction fixing device to suckingly hold the polarizing film. Then, a peeling tape is attached to one end of the separator, and pulled to thereby peel off the separator from the polarizing film. However, in a thinned polarizing film having a thickness, for example, of 90 μm or less, low rigidity of the polarizing film causes a problem that the polarizing film drops from the stage due to a force of the peeling. Although the suction force for the polarizing film may be increased so as to prevent the dropping of the polarizing film, a suction mark is likely to be left due to the thinness of the polarizing film. Therefore, in order to prevent the polarizing film from dropping from the stage during the operation of peeling off the separator from the thinned polarizing film, even under a low suction force, the polarizing film in the present invention may comprise an adhesive layer having an adhesive force set to allow a peel force of the separator to become 0.10 N/50 mm-width or less. Thus, the peel force of the separator can be reduced to thereby allow the separator to be peeled without causing deformation of the polarizing film and dropping of the polarizing film from the stage. After peeling the separator, the resulting optical film laminate can be laminated to a crystal cell through the adhesive layer to produce a liquid crystal display device.

Meanwhile, applications of a thinned polarizing film are spread over a wide range, and therefore the thinned polarizing film is required to be excellent in durability even in a high-temperature and/or high-humidity environment. As a result of inventors' strict studies, a phenomenon was found that, when a thinned, adhesive layer and polarizing film combination structure is left in a high-temperature and/or high-humidity environment for a long period of time, the adhesive layer and polarizing film combination structure becomes more likely to undergo deformation due to the thickness reduction. Specifically, the reason for such deformation is probably because a polarizer and/or a transparent protective film become more likely to undergo contraction, particularly, along with thickness reduction, and peeling or foaming occurs in an edge region of the adhesive layer. As above, it was found that, in the case where the adhesive layer and polarizing film combination structure is reduced in thickness, a particular problem occurs due to the thickness reduction. Therefore, there is a need to solve this problem.

In the separator-attached adhesive layer and polarizing film combination structure production method of the present invention, an adhesive layer is formed from the adhesive composition containing a phenolic antioxidant, together with a (meth)acryl-based polymer and a peroxide. In such an adhesive layer, during cross-linking of the (meth)acryl-based polymer, inhibition of radical cross-linking due to oxygen can be effectively suppressed by the antioxidant, so that it becomes possible to efficiently form a three-dimensional cross-linked network of the adhesive layer. That is, the addition of a combination of the antioxidant and the peroxide into the adhesive layer-forming adhesive composition makes it possible to more effectively prevent the occurrence of abnormality in external appearance of the edge region of the adhesive layer. This makes it possible to produce not only a separator-attached adhesive layer and polarizing film combination structure comprising a polarizer film having a relatively large total thickness but also a separator-attached adhesive layer and polarizing film combination structure comprising a polarizer film having a total thickness of 100 μm or less, while preventing abnormality in external appearance of an edge region thereof and enhancing durability.

DESCRIPTION OF EMBODIMENTS

Figure 1:
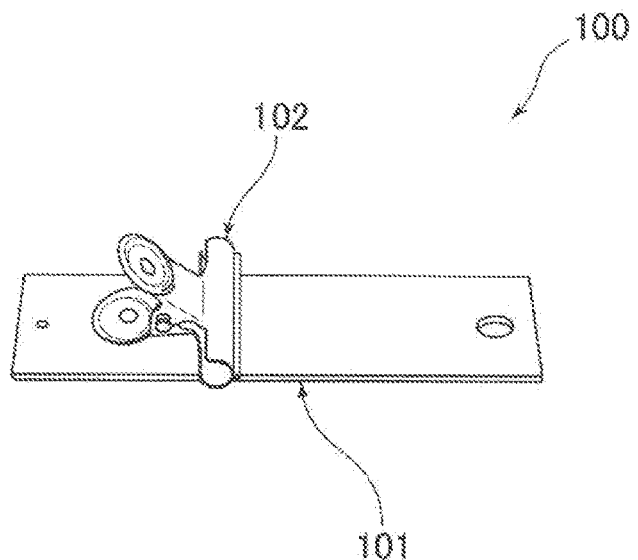
FIG. 1 is a schematic diagram illustrating a jig for a peel force test.

A separator-attached adhesive layer structure production method of the present invention comprises: a first step of forming a layer of an adhesive composition containing a (meth)acryl-based polymer, a peroxide and a phenolic antioxidant, on a release treatment surface of a separator subjected to a release treatment; and a second step of, after completion of the first step, heating the adhesive composition to cause cross-linking therein so as to be formed as an adhesive layer.

As the separator subjected to a release treatment, a silicone-coated release liner is preferably used. In the second step of heating the adhesive composition applied on such a liner to cause cross-linking therein so as to be formed as an adhesive layer, with a view to enhancing an adhesive characteristic of the adhesive layer, for example, a heating temperature is preferably set to 70 to 170° C., more preferably, 125 to 165° C., further more preferably, 140 to 160° C. A heating tine is preferably set to 30 to 240 seconds, more preferably, 60 to 180 seconds.

As described in "Handbook of Adhesive (2nd Edition), Japan Adhesive Tape Manufacturers Association, Oct. 12, 1995", the silicone-coated release liner includes a release liner using a condensation reaction type release agent (e.g., typically, a release liner comprising: a base polymer composed of polydimethylsiloxane having hydroxyl groups at respective opposite ends thereof; a cross-linking agent composed of polymethylhydrogensiloxane; and a catalyst composed of a tin-based catalyst), and a release liner using an additional reaction-type release agent (e.g., typically, a release liner comprising: a base polymer composed of polydimethylsiloxane having hydroxyl groups at respective opposite ends thereof, wherein a part of methyl groups thereof is substituted by a vinyl group; a cross-linking agent composed of polymethylhydrogensiloxane; and a catalyst composed of a platinum-based catalyst). The separator in the present invention is not particularly limited, but may be a release liner using either one of the release agents.

In the first step of forming a layer of the adhesive composition, a process for forming a layer of the adhesive composition on a release treatment surface of the separator subjected to a release treatment may comprise directly applying the adhesive composition onto the separator and heating and drying a layer of the adhesive composition on the separator, or may comprise transferring a layer of the adhesive composition formed on a different substrate to the separator.

As means to form the adhesive layer, various techniques may be employed. Specific examples thereof include roll coating, kiss roll coating, gravure coating, reverse coating, roll brushing, spray coating, dip roll coating, bar coating, knife coating, air knife coating, curtain coating, lip coating, and extrusion coating using a die coater or the like.

A thickness of the adhesive layer is be set, for example, to, but not particularly limited to, about 3 to 35 μm, preferably, 5 to 30 μm, more preferably, 8 to 25 μm.

Examples of a material component of the separator include: a plastic film such as a polyethylene, polypropylene, polyethylene terephthalate or polyester film; a porous material such as paper, woven fabric or nonwoven fabric; and an appropriate thin sheet body such as net, foamed sheet, metal foil or laminate thereof. From a viewpoint of excellent surface smoothness, a plastic film is suitably used.

The plastic film is not particularly limited, as long as it is a film capable of protecting the adhesive layer may be used. Examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally set to about 5 to 200 μm, preferably, about 5 to 100 μm. On an as-needed basis, the separator may be subjected to release and anti-fouling treatments using a silicone-based, fluoride-based, long-chain alkyl-based or fatty acid amide-based release agent, a silica powder or the like, or may be subjected to an antistatic treatment using an antistatic agent such as an application type, a kneading type, a vapor deposition type or the like. Particularly, a surface of the separator may be appropriately subjected to a release treatment such as a silicone treatment, a long-chain alkyl treatment or a fluorine treatment, to further enhance peelability of the separator from the adhesive layer.

The adhesive layer is obtained using, as a raw material, the adhesive composition, wherein the adhesive composition comprises a (meth)acryl-based polymer. Generally, the (meth)acryl-based polymer contains, as a primary component, an alkyl(meth)acrylate monomer unit. As used herein, the term "(meth)acrylate" means acrylate and/or methacrylate, and "(meth)" is used in the same meaning in this specification.

As alkyl(meth)acrylate making up a main skeleton of the (meth)acryl-based polymer, a straight or branched chain alkyl group having a carbon number of 1 to 18 may be exemplified. Examples of the alkyl group may include a methyl group, an ethyl group, a propyl group, an isopropyl group, a butyl group, an isobutyl group, an amyl group, a hexyl group, a cyclohexyl group, a heptyl group, a 2-ethylhexyl group, an isooctyl group, a nonyl group, a decyl group, an isodecyl group, a dodecyl group, an isomyristyl group, a lauryl group, a tridecyl group, a pentadecyl group, a hexadecyl group, a heptadecyl group, an octadecyl group. These may be used independently or in the form of a combination of two or more of them. An average carbon number of the above alkyl groups is preferably set to 3 to 9.

Preferably, the (meth)acryl-based polymer contains, as a monomer unit, a hydroxyl group-containing monomer. Specifically, examples thereof include 2-hydroxyethyl(meth)acrylate, 3-hydroxypropyl(meth)acrylate, 4-hydroxybutyl (meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, and (4-hydroxymethylcyclohexyl)-methyl acrylate. A ratio of the hydroxyl group-containing monomer in the (meth)acryl-based polymer is preferably set to 0.1 to 10 weight %, more preferably, 0.2 to 5 weight %, in terms of a weight ratio with respect to all monomers (100 weight %) of the (meth)acryl-based polymer.

Particularly in the case where the cross-linking is performed using an isocyanate-based cross-linking agent, among the above monomers, 4-hydroxybutyl(meth)acrylate is suitable, from a viewpoint of efficiently ensuring a cross-linking site with an isocyanate group.

In view of adhesive characteristic, durability, adjustment of retardation, adjustment of refractive index, and the like, it is also possible to use an aromatic ring-containing alkyl (meth)acrylate such as phenoxyethyl(meth)acrylate, or benzil(meth)acrylate. The aromatic ring-containing alkyl(meth) acrylate may be used in such a manner that it is polymerized and a resulting polymer is mixed with the above (meth) acryl-based polymer. However, from a viewpoint of transparency, the aromatic ring-containing alkyl(meth)acrylate is preferably used in such a manner as to be copolymerized with the (meth)acryl-based polymer.

A ratio of the aromatic ring-containing alkyl(meth)acrylate in the (meth)acryl-based polymer is preferably set to 50 weight % or less, in terms of a weight ratio with respect to all monomers (100 weight %) of a hydroxyl group-containing (meth)acryl-based polymer (A). A content rate of the aromatic ring-containing alkyl(meth)acrylate is preferably set to 1 to 15 weight %, more preferably, 5 to 30 weight %, further more preferably, 10 to 25 weight %.

With a view to improving adhesiveness and heat resistance, at least one type of copolymerizable monomer comprising a polymerizable functional group having an unsaturated double bond, such as a (meth)acryloyl group or a vinyl group, may be introduced into the (meth)acryl-based polymer by means of copolymerization. Specific examples of the copolymerizable monomer include: carboxyl group-containing monomers, such as (meth)acrylic acid, carboxyethyl (meth)acrylate, carboxypentyl(meth)acrylate, itaconic acid, maleic acid, fumaric acid, and crotonic acid; acid anhydride group-containing monomers, such as maleic acid anhydride and itaconic acid anhydride; sulfonate group-containing monomers, such as styrenesulfonic acid, allyl sulfonic acid, 2-(meth)acrylamide-2-methylpropanesulfonic acid, (meth) acrylamidopropanesulfonic acid, sulfopropyl(meth)acrylate, and (meth)acryloyloxy naphthalenesulfonic acid; and phosphate group-containing monomers, such as 2-hydroxyethyl acryloyloxy phosphate.

Examples of a monomer usable for the purpose of property modification include: (N-substituted) amine-based monomers, such as (meth)acrylamide, N,N-dimethyl(meth) acrylamide, N-butyl(meth)acrylamide, N-methylol(meth) acrylamide, and N-methylolpropane(meth)acrylamide; alkylaminoalkyl(meth)acrylate monomers, such as aminoethyl(meth)acrylate, N,N-dimethylaminoethyl(meth)acrylate, and t-butylaminoethyl(meth)acrylate; alkoxyalkyl (meth)acrylate-based monomers, such as methoxyethyl (meth)acrylate, and ethoxy ethyl(meth)acrylate; succinimide-based monomers, such as N-(meth)acryloyloxymethylenesuccinimide, N-(meth)acryloyl-6-oxyhexamethylenesuccinimide, N-(meth)acryloyl-8-oxyoctamethylenesuccinimide and N-acryloylmorpholine; maleimide-based monomers, such as N-cyclohexyl maleimide, N-isopropylmaleimide, N-lauryl maleimide, and N-phenyl maleimide; itaconimide-based monomers, such as N-methyl itaconimide, N-ethyl itaconimide, N-butyl itaconimide, N-octyl itaconimide, N-2-ethylhexyl itaconimide, N-cyclohexyl itaconimide, and N-lauryl itaconimide.

As the modifying monomer, it is also possible to use: a vinyl-based monomer, such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinyl-carboxylic acid amides, styrene, α-methylstyrene or N-vinylcaprolactam; a cyanoacrylate-based monomer, such as acrylonitrile or methacrylonitrile; an epoxy group-containing acryl-based monomer, such as glycidyl(meth)acrylate; a glycol-based acryl ester monomer, such as polyethylene glycol(meth)acrylate, polypropylene glycol(meth)acrylate, methoxyethylene glycol (meth)acrylate, or methoxy polypropylene glycol(meth) acrylate; an acrylic acid ester-based monomer, such as tetrahydrofurfuryl(meth)acrylate, fluorine(meth)acrylate, silicone(meth)acrylate or 2-methoxyethyl acrylate. Examples thereof further include isoprene, butadiene, isobutylene and vinyl ether.

Other examples of the copolymerizable monomer include a silane-based monomer containing a silicon atom. Examples of the silane-based monomer include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

As the copolymerizable monomer, it is also possible to use: a polyfunctional monomer having two or more unsaturated double bonds of a (meth)acryloyl group, a vinyl group or the like, such as an esterified substance of (meth)acrylic acid and polyalcohol, wherein the esterified substance includes: tripropylene glycol di(meth)acrylate, tetraethylene glycol di(meth)acrylate, 1,6-hexanediol di(meth)acrylate, bisphenol A diglycidyl ether di(meth)acrylate, neopentyl glycol di(meth)acrylate, trimethylolpropane tri(meth)acrylate, pentaerythritol tri(meth)acrylate, pentaerythritol tetra (meth)acrylate, dipentaerythritol penta(meth)acrylate, dipentaerythritol hexa(meth)acrylate, and caprolactone-modified dipentaerythritol hexa(meth)acrylate; and polyester(meth)acrylate, epoxy(meth)acrylate and urethane(meth) acrylate obtained by adding, as the same functional group as that in the monomer component, two or more unsaturated double bonds of a (meth)acryloyl group, a vinyl group or the like, respectively, to polyester, epoxy and urethane as a backbone.

The (meth)acryl-based polymer consists primarily of alkyl(meth)acrylate in terms of a weight % with respect to all monomers thereof, and a ratio of the copolymerizable monomer in the (meth)acryl-based polymer is set, for example, to, but not particularly limited to, about 0 to 20%, preferably, about 0.1 to 15%, more preferably, about 0.1 to 10%.

Among the above copolymerizable monomers, the carboxyl group-containing monomer is preferably used from a viewpoint of adhesiveness and durability. In the case where the adhesive composition contains a cross-linking agent, the carboxyl group-containing monomer serves as a reactive site with the cross-linking agent. The carboxyl group-containing monomer is sufficiently reactive with an intermolecular cross-linking agent, so that it is preferably used to enhance cohesion property and heat resistance of a resulting adhesive layer. The carboxyl group-containing monomer is preferable from a viewpoint of satisfying both durability and reworkability.

In the case where the carboxyl group-containing monomer is used as the copolymerizable monomer, the content rate thereof is preferably set to 0.05 to 10 weight %, more preferably, 0.1 to 8 weight %, further more preferably, 0.2 to 6 weight %.

Generally, as the (meth)acryl-based polymer for use in the present invention, a type having a weight-average molecular weight of 500,000 to 3,000,000 is suitably used. Considering durability, particularly, heat resistance, the weight-average molecular weight is more preferably 1,000,000 to 2,700,000, further more preferable, 1,300,000 to 2,500,000. A type having a weight-average molecular weight of less than 500,000 is undesirable in terms of heat resistance. On the other hand, a type having a weight-average molecular weight of greater than 3,000,000 requires a large amount of diluting solvent to adjust viscosity for coating, thereby undesirably leading to an increase in cost. As used herein, the term "weight-average molecular weight" means a value obtained by subjecting a measurement value from GPC (gel permeation chromatography), to a polystyrene conversion.

As regards production of the (meth)acryl-based polymer, it is possible to selectively use one of conventional production methods such as solution polymerization, bulk polymerization, emulsion polymerization and various radical polymerizations, on a case-by-case basis. The resulting (meth)acryl-based polymer may be any type of copolymer such as a random copolymer, a block copolymer or a graft copolymer.

In the solution polymerization, for example, ethyl acetate or toluene is used as a polymerization solvent. As a specific example of the solution polymerization, a reaction is induced by adding a polymerization initiator in a stream of inert gas such as nitrogen, and, typically, under reaction conditions including a reaction temperature of about 50 to about 70° C. and a reaction time of about 5 to 30 hours.

An additive for use in the radical polymerization, such as a polymerization initiator, a chain transfer agent or an emulsifier, is not particularly limited, but may be appropriately selected and used. A weight-average molecular weight of the (meth)acryl-based polymer can be controlled by the reaction conditions and/or an amount of the polymerization initiator and/or the chain transfer agent to be used, and the amount may be appropriately adjusted according to a type of the additive.

Examples of the polymerization initiator include, but are not limited to, azo-based initiators, such as 2,2'-azobisisobutylonitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, produced by Wako Pure Chemical Industries, Ltd.); peroxide-based initiators, such as: persulfates including potassium persulfate and ammonium persulfate; di(2-ethylhexyl)peroxydicarbonate, di(4-t-butylcyclohexyl)peroxydicarbonate, di-sec-butylperoxydicarbonate, t-butylperoxyneodecanoate, t-hexylperoxypivalate, t-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, t-butylperoxyisobutylate, 1,1-di(t-hexylperoxy)cyclohexane, t-butylhydroperoxide, and hydrogen peroxide; and redox-based initiators, such as a combination of peroxide and reducing agent, including a combination of persulfate and sodium hydrogen sulfite, and a combination of peroxide and sodium ascorbate.

The above polymerization initiators may be used independently, or in the form of a mixture of two or more thereof. A total content thereof is preferably set to about 0.005 to 1 weight parts, more preferably, about 0.02 to 0.5 weight parts, with respect to 100 weight parts of the monomer(s).

For example, in the case where the hydroxyl group-containing (meth)acryl-based polymer (A) having the above weight-average molecular weight is produced using 2,2'-azobisisobutyronitrile as the polymerization initiator, an amount of the polymerization initiator to be used is preferably set to about 0.06 to 0.2 weight parts, more preferably, about 0.08 to 0.175 weight parts, with respect to 100 weight parts (total amount) of the monomer component.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. While the chain transfer agents may be used independently, or in the form of a mixture of two or more thereof, a total content of the chain transfer agent is preferably set to about 0.1 weight parts or less, with respect to 100 weight parts (total amount) of the monomer component.

Examples of an emulsifier for use in the emulsion polymerization include: anionic surfactants, such as sodium laurylsulfate, ammonium laurylsulfate, sodium dodecylbenzenesulfonate, polyoxyethylene alkyl ether ammonium sulfate, and sodium polyoxyethylene alkyl phenyl ether sulfate; and nonionic surfactants, such as polyoxyethylene alkyl ether, polyoxyethylene alkyl phenyl ether, polyoxyethylene fatty acid ester, and polyoxyethylene-polyoxypropylene block polymer. These emulsifiers may be used independently, or in the form of a combination of two or more thereof.

Further, as specific examples of a reactive emulsifier, i.e., an emulsifier into which a radical-polymerizable functional group such as a propenyl group or an allyl ether group is introduced, there are Aqualon HS-10, HS-20, KH-10, BC-05, BC-10 and BC-20 (each produced by Dai-Ichi Kogyo Seiyaku Co., Ltd.), and Adeka Reasoap SE10N (produced by ADEKA Corporation). The reactive emulsifier is incorporated in a polymer chain after polymerization to thereby desirably provide enhanced water resistance. With respect to 100 weight parts (total amount) of the monomer component, an amount of the emulsifier to be used is set to 0.3 to 5 weight parts, more preferably, 0.5 to 1 weight parts from a viewpoint of polymerization stability or mechanical stability.

In the separator-attached adhesive layer structure production method of the present invention, a peroxide is contained in the adhesive layer-forming adhesive composition. As the peroxide, any type may be appropriately used as long as it is capable of generating radical active species by heating or light irradiation to promote cross-linking of the base polymer of the adhesive composition. In view of work efficiency and stability, it is preferable to use a type having a one-minute half-life temperature of 80 to 160° C., and it is more preferable to use a type having a one-minute half-life temperature of 90 to 140° C.

Examples of a usable type as the peroxide include di(2-ethylhexyl)peroxydicarbonate (one-minute half-life temperature: 90.6° C.), di(4-t-butylcyclohexyl)peroxydicarbonate (one-minute half-life temperature: 92.1° C.), di-sec-butyl peroxydicarbonate (one-minute half-life temperature: 92.4° C.), t-butyl peroxyneodecanoate (one-minute half-life temperature: 103.5° C.), t-hexyl peroxypivalate (one-minute half-life temperature: 109.1° C.), t-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl)peroxide (one-minute half-life temperature: 128.2° C.), dibenzoyl peroxide (one-minute half-life temperature: 130.0° C.), t-butyl peroxyisobutylate (one-minute half-life temperature: 136.1° C.), and 1,1-di(tert-hexylperoxy)cyclohexane (one-minute half-life temperature: 149.2° C.). Among them, di(4-t-butylcyclohexyl)peroxydicarbonate (one-minute half-life temperature: 92.1° C.), dilauroyl peroxide (one-minute half-life temperature: 116.4° C.) and dibenzoyl peroxide (one-minute half-life temperature: 130.0° C.) are preferably used because these are particularly excellent in cross-linking reaction efficiency.

As used herein, the term "half-life of a peroxide" means an index representing a decomposition rate of the peroxide, and specifically means a period of time before a remaining amount of the peroxide reaches one-half. A decomposition temperature for obtaining a half-life in an arbitrary time and a half-life time for obtaining a half-life at an arbitrary temperature are described in a manufacturer's catalog or the like, such as "Organic Peroxide Catalog, 9th edition (May, 2003)", NOF Corporation.

The peroxide is preferably contained in an amount of 0.05 to 2 weight parts, more preferably, 0.1 to 1 weight parts, with respect to 100 weight parts of the (meth)acryl-based polymer. If the content is less than 0.05 weight parts, a peel force of the separator tends to become excessively small. On the other hand, if the content is greater than 2 weight parts, the peel force tends to become excessively large, and a residual amount of the peroxide in the adhesive layer is increased, thereby causing a possibility that the adhesive characteristic of the adhesive layer changes with time.

As means to measure a decomposition amount of the peroxide remaining after a reaction treatment, measurement using HPLC (high performance liquid chromatography) may be employed.

More specifically, for example, after a reaction treatment, the adhesive composition is collected by about 0.2 g, and subjected to shaking extraction at 25° C. and at 120 rpm for 3 hours in a shaking apparatus, while being immersed in 10 ml of ethyl acetate. Then, a resulting extract is statically placed at room temperatures for 3 days. Then, 10 ml of acetonitrile is added thereto, and a resulting mixture is shaken at 25° C. and at 120 rpm for 30 minutes. About 10 μl of an extracted solution obtained by filtration using a membrane filter (0.45 μm) is poured in and analyzed by HPLC. In this way, an amount of the peroxide after the reaction treatment can be obtained.

In the present invention, as the cross-linking agent, an isocyanate-based cross-linking agent may be used. Examples of a compound relating to the isocyanate-based cross-linking agent include: isocyanate monomers, such as tolylene diisocyanate, chlorophenylene diisocyanate, tetramethylene diisocyanate, xylylene diisocyanate, diphenylmethane diisocyanate, and hydrogenated diphenylmethane diisocyanate; isocyanate compounds, isocyanurate compounds or burette type compounds obtained by adding the respective isocyanate monomers to trimethylolpropane or the like; and urethane prepolymer type isocyanate obtained by an addition reaction of polyether polyol, polyester polyol, acrylic polyol, polybutadiene polyol, polyisoprene polyol or the like. Among them, a particularly preferable cross-linking agent is a polyisocyanate compound such as one selected from the group consisting of hexamethylene diisocyanate, hydrogenated xylylene diisocyanate, and isophorone diisocyanate, or a derivative thereof. Examples of the one selected from the group consisting of hexamethylene diisocyanate, hydrogenated xylylene diisocyanate, and isophorone diisocyanate, or a derivative thereof include hexamethylene diisocyanate, hydrogenated xylylene diisocyanate, isophorone diisocyanate, polyol-modified hexamethylene diisocyanate, polyol-modified hydrogenated xylylene diisocyanate, trimer-type hydrogenated xylylene diisocyanate, and polyol-modified isophorone diisocyanate. In particular, the exemplified polyisocyanate compounds desirably contribute to quickness of cross-linking, because a reaction with a hydroxyl group quickly progresses using an acid or base contained in the polymer, like a catalyst.

In the case where the isocyanate-based cross-linking agent is used in combination with the peroxide, the isocyanate-based cross-linking agent is preferably contained in an amount of 0.02 to 2 weight parts, more preferably, 0.05 to 1 weight parts, with respect to 100 weight parts of the (meth) acryl-based polymer. In the case where the isocyanate-based cross-linking agent is contained in the adhesive composition, the isocyanate-based cross-linking agent tends to require a longer reaction time as compared with the peroxide. This is likely to lead to fouling, void or the like of the adhesive layer, thereby causing deterioration in processability, appearance property and durability of the adhesive layer. For this reason, the content of the isocyanate-based cross-linking agent in the adhesive composition is preferably set to 5 to 1000, more preferably 20 to 300, on the assumption that the content of the peroxide is 100.

In the present invention, in addition to the peroxide and the isocyanate-based cross-linking agent, a heretofore known cross-linking agent may further be contained in the adhesive layer-forming adhesive composition. It is possible to use, as the cross-linking agent, an organic cross-linking agent or a polyfunctional metal chelate. Examples of the organic cross-linking agent include an epoxy-based cross-linking agent and an imine-based cross-linking agent. The polyfunctional metal chelate has a structure in which a polyvalent metal is covalently or coordinately bonded to an organic compound. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. For example, the covalently- or coordinately-bonded atom in the organic compound may be an oxygen atom. Examples of the organic compound include alkyl esters, alcohol compounds, carboxylic acid compounds, ether compounds, and ketone compounds.

The separator-attached adhesive layer structure production method of the present invention is characterized in that a phenolic antioxidant is contained in the adhesive layer-forming adhesive composition to serve as a peel force adjuster for adjusting a peel force with respect to the separator. Examples of the phenolic antioxidant may include: monocyclic phenol compounds, such as 2,6-di-tert-butyl-p-cresol, 2,6-di-tert-butyl-4-ethylphenol, 2,6-dicyclohexyl-4-methylphenol, 2,6-diisopropyl-4-ethylphenol, 2,6-di-tert-amyl-4-methylphenol, 2,6-di-tert-octyl-4-n-propylphenol, 2,6-dicyclohexyl-4-n-octylphenol, 2-isopropyl-4-methyl-6-tert-butylphenol, 2-tert-butyl-4-ethyl-6-tert-octylphenol, 2-isobutyl-4-ethyl-6-tert-hexylphenol, 2-cyclohexyl-4-n-butyl-6-isopropylphenol, cresol mixed cresol, DL-α-tocopherol, and stearyl β-(3,5-di-tert-butyl-4-hydroxyphenyl)propionate; bicyclic phenol compounds, such as 2,2'-methylene-bis(4-methyl-6-tert-butylphenol), 4,4'-butylidene-bis(3-methyl-6-tert-butylphenol), 4,4'-thio-bis(3-methyl-6-tert-butylphenol), 2,2'-thio-bis(4-methyl-6-tert-butylphenol), 4,4'-methylene-bis(2,6-di-tert-butylphenol), 2,2'-methylene-bis[6-(1-methylcyclohexyl)-p-cresol], 2,2'-ethylidene-bis(4,6-di-tert-butylphenol), 2,2'-butylidene-bis(2-tert-butyl-4-methylphenol), 3,6-dioxaoctamethylene-bis[3-(3-tert-butyl-4-hydroxy-5-methylphenyl)propionate], triethyleneglycol-bis[3-(3-tert-butyl-5-methyl-4-hydroxyphenyl)propionate], 1,6-hexanedio-bis[3-(3,5-di-tert-butyl-4-hydroxyphenyl) propionate], and 2,2'-thiodiethylene-bis[3-(3,5-di-tert-butyl-4-hydroxyphenyl)propionate]; tricyclic phenol compounds such as 1,1,3-tris(2-methyl-4-hydroxy-5-tert-butylphenyl) butane, 1,3,5-tris(2,6-dimethyl-3-hydroxy-4-tert-butylbenzyl)isocyanurate, 1,3,5-tris[(3,5-di-tert-butyl-4-hydroxyphenyl)propionyloxyethyl]isocyanurate, tris(4-tert-butyl-2, 6-dimethyl-3-hydroxybenzyl)isocyanurate, and 1,3,5-trimethyl-2,4,6-tris(3,5-di-tert-butyl-4-hydroxybenzyl) benzene; tetracyclic phenol compounds such as tetrakis [methylene-3-(3,5-di-tert-butyl-4-hydroxyphenyl) propionate]methane; and phosphorus-containing phenol compounds such as potassium bis(3,5-di-tert-butyl-4-hydroxybenzylphosphonic acid ethyl ester) and nickel bis(3, 5-di-tert-butyl-4-hydroxybenzylphosphonic acid ethyl ester).

The phenolic antioxidant is preferably contained in an amount of 0.05 to 3 weight parts, more preferably, 0.1 to 1.5 weight parts, with respect to 100 weight parts of the (meth) acryl-based polymer. If the content is less than 0.05 weight parts, the peel force of the separator with respect to the adhesive layer becomes excessively high, thereby causing difficulty in peeling of the separator and deterioration in process work efficiency. On the other hand, if the content is greater than 3 weight part, the peel force of the separator with respect to the adhesive layer becomes excessively low, thereby causing the occurrence of lifting of the separator.

In the present invention, a silane coupling agent may further be contained in the adhesive composition. The use of the silane coupling agent makes it possible to enhance durability of the adhesive layer. Specific examples of the silane coupling agent include: epoxy group-containing silane coupling agents, such as 3-glycidoxypropyltrimethoxysilane 3-glycidoxypropyltriethoxysilane, 3-glycidoxypropylmethyldiethoxysilane, and 2-(3,4-epoxycyclohexyl)ethyltrimethoxysilane; amino group-containing silane coupling agents, such as 3-aminopropyltrimethoxysilane, N-2-(aminoethyl)-3-aminopropylmethyldimethoxysilane, 3-triethoxysilyl-N-(1,3-dimethylbutylidene)propylamine, and N-phenyl-γ-aminopropyltrimethoxysilane; (meth)acrylic group-containing silane coupling agents, such as 3-acryloxypropyltrimethoxysilane and 3-methacryloxypropyltriethoxysilane; and isocyanate group-containing silane coupling agents, such as 3-isocyanatopropyltriethoxysilane.

While the above silane coupling agents may be used independently or in the form of a combination of two or more of them, a total content of the silane coupling agent(s) is preferably set to 0.001 to 5 weight parts, more preferably 0.01 to 1 weight parts, further more preferably 0.02 to 1 weight parts, with respect to 100 weight parts of the (meth) acryl-based polymer. This content is set so as to enhance the durability to thereby appropriately maintain the adhesive force with respect to an optical member such as a liquid crystal cell.

In the present invention, a polyether-modified silicone may further be contained in the adhesive composition. The polyether-modified silicone may be a type as disclosed, for example, in JP 2010-275522A.

The polyether-modified silicone has a polyether skeleton, and comprises, at least one end thereof, a reactive silyl group represented by the following general formula (1): —$SiR_aM_{3-a}$, (wherein: R denotes a monovalent organic group which has a carbon number of 1 to 20 and may include a substituent; M denotes a hydroxyl group or a hydrolyzable group; and a denotes an integer of 0 to 2, where, when there are a plurality of Rs, the Rs may be identical to or different from each other, and, when there are a plurality of Ms, the Ms may be identical to or different from each other.

The polyether-modified silicone may be a compound represented by the following general formula (2): $R_aM_{3-a}Si$—X—Y-$(AO)_n$—Z (wherein: R denotes a monovalent organic group which has a carbon number of 1 to 20 and may contain a substituent, where, when there are a plurality of Rs, the Rs may be identical to or different from each other; M denotes a hydroxyl group or a hydrolyzable group; and a denotes an integer of 0 to 2, where, when there are a plurality of Ms, the Ms may be identical to or different from each other; AO denotes a straight- or branched-chain oxyalkylene group having a carbon number of 1 to 10; n denotes a value of 1 to 1,700 which is an average additional mole number of oxyalkylene groups; X denotes a straight- or branched-chain alkylene group having a carbon number of 1 to 20; Y denotes an ether bond, an ester bond, a urethane bond, or a carbonate bond; Z denotes a hydrogen atom, a monovalent hydrocarbon group of 1 to 10 carbon atoms, a group represented by the following general formula (2A): —$Y_1$—X—$SiR_aM_{3-a}$ (wherein R, M, X, and a are the same as those described above, and $Y_1$ denotes a single bond, a —CO— bond, a —CONH— bond, or a —COO— bond), or a group represented by the following general formula (2B): -Q{-(OA)n-Y—X—$SiR_aM_{3-a}$}$_m$ (wherein: R, M, X, Y, and a are the same as those described above; OA is the same as the AO described above; n is the same as that described above; Q denotes a divalent or polyvalent hydrocarbon group having a carbon number of 1 to 10; and m denotes a number which is identical to a valence of the hydrocarbon group).

Specific examples of the polyether-modified silicone include MS Polymers S203, S303, and S810 produced by Kaneka Corporation; SILYL EST250 and EST280 produced by Kaneka Corporation; SILYL SAT10, SILYL SAT200, SILYL SAT220, SILYL SAT350, and SILYL SAT400 produced by Kaneka Corporation; and EXCESTAR S2410, S2420, or S3430 produced by Asahi Glass Co., Ltd.

In the present invention, any other heretofore-known additive may further be contained in the adhesive layer-forming adhesive composition. That is, depending on the intended use, it is possible to add an additive, such as a powder of colorant, pigment or the like, a dye, a surfactant, a plasticizer, an adhesiveness imparting agent, a surface lubricant, a leveling agent, a softening agent, an age resistor, a light stabilizer, an ultraviolet absorber, a polymerization inhibitor, an inorganic or organic filler, a metal powder, or a particle- or foil-like substance. A redox system may be employed by adding a reducing agent within a controllable range.

The separator-attached adhesive layer structure can be produced by the aforementioned production method. For providing an appropriate peel force of the separator with respect to the adhesive layer to enhance the processability of the separator-attached adhesive layer structure, a gel fraction of the adhesive layer after the heating and cross-linking is preferably set to 45 to 95 weight %, more preferably, 65 to 90 weight %. A measurement method for the gel fraction of the adhesive layer will be described later.

The separator-attached adhesive layer structure is formed by heating the adhesive composition containing the (meth) acryl-based polymer, the peroxide and the phenolic antioxidant to cause cross-linking therein. Thus, the peel force of the separator with respect to the adhesive layer is adjusted to a moderate level. For allowing the separator-attached adhesive layer structure to have excellent processability and durability, the peel force of the separator with respect to the adhesive layer is preferably set to 0.05 to 0.30 N/50 mm-width, more preferably, 0.06 to 0.17 N/50 mm-width, further more preferably, 0.07 to 0.15 N/50 mm-width. If the peel force is less than 0.05 N/50 mm-width, there is a possibility of the occurrence of a situation where, during processing of the separator-attached adhesive layer and polarizing film combination structure, the separator is lifted from the adhesive layer of the combination structure. On the other hand, if the peel force is greater than 0.30 N/50 mm-width, an operation of peeling off the separator from the adhesive layer of the separator-attached adhesive layer and polarizing film combination structure is likely to become difficulty, thereby possibly causing deterioration in productivity.

In the present invention, by using the above adhesive layer, it becomes possible to provide a polarizing plate comprising: a polarizing film comprising a polarizer film and a protective film; and an adhesive layer. The adhesive layer has an adhesive force set to allow a peel force of a separator with respect to the polarizing film to become 0.10 N/50 mm-width or less. For example, an adhesive layers in Inventive Example 6 has an adhesive force allowing the peel force of the separator with respect to the polarizing film to become 0.10 N/50 mm-width, and adhesive layers in Inventive Example 3, Inventive Example 5, Inventive Example 13 and Inventive Example 14 have adhesive forces allowing the peel force to become 0.09 N/50 mm-width, 0.08 N/50 mm-width, 0.07 N/50 mm-width and 0.05 N/50 mm-width, respectively. The adhesive force of the adhesive layer is relatively low, and thereby the separator can be peeled off by a relatively small force, so that a force applied from the separator to the polarizing film during the operation of peeling off the separator from the polarizing film can be reduced, and thereby the polarizing film becomes less likely to dropping from a stage for suckingly holding the polarizing film. Further, an adhesive force of the adhesive layer with respect to glass is preferably set to 2.0 to 5.0 N/25 mm-width. If the adhesive force is less than 2.0 N/25 mm-width, there is a possibility of the occurrence of a situation where, in a heating durability test for a polarizing film, the polarizing film peels from a liquid crystal display panel having a glass surface. On the other hand, in a situation where, after a polarizing film is laminated to the liquid crystal display panel, the polarizing film needs to be peeled off therefrom, if the adhesive force is greater than 5.0 N/25 mm-width, the polarizing film is broken, thereby causing a problem that the polarizing film cannot be peeled off from the liquid crystal display panel.

The separator-attached adhesive layer and polarizing film combination structure of the present invention is characterized in that it is obtained by a separator-attached adhesive layer and polarizing film combination structure production method which comprises laminating a separator-attached adhesive layer structure to at least one surface of a polarizing film comprising a polarizer and a transparent protective film attached to at least one surface of the polarizer, through a surface of an adhesive layer of the separator-attached adhesive layer structure, wherein this separator-attached adhesive layer structure is composed of a structure produced by the aforementioned separator-attached adhesive layer structure production method.

As long as a separator-attached adhesive layer and polarizing film combination structure is produced using a structure produced by the separator-attached adhesive layer structure the production method of the present invention, the peel force of the separator with respect to the adhesive layer can be moderately adjusted, irrespective of a thickness of a polarizing film of the combination structure. Even in the case where a separator-attached adhesive layer and polarizing film combination structure comprising a polarizing film having a relatively small thickness is produced, as long as the separator-attached adhesive layer structure of the present invention is used, the separator of the resulting separator-attached adhesive layer and polarizing film combination structure can have moderate light peelability with respect to the adhesive layer to provide excellent processability. In addition, the resulting separator-attached adhesive layer and polarizing film combination structure is prevented from abnormality in external appearance of an edge region thereof and thereby enhanced in durability. Therefore, considering the need for thickness reduction of the adhesive layer and polarizing film combination structure, the separator-attached adhesive layer structure of the present invention can be suitably used for a separator-attached adhesive layer and polarizing film combination structure comprising a polarizing film having a total thickness, particularly, of 100 μm or less, more particularly, 70 μm or less, further more particularly, 50 μm or less. A lower limit of the total thickness of the polarizing film is set, for example, to, but not particularly limited to, 10 μm.

As mentioned above, in order to meet the need for thickness reduction of the adhesive layer and polarizing film combination structure, the total thickness of the polarizing film is preferably set to 100 μm or less. As a polarizer constituting the polarizing film, various types may be used without particular limitations. However, from a viewpoint of the above thickness reduction, it is preferable to use a thinned polarizer having a thickness of 10 μm or less. More preferably, the thickness is set to 1 to 7 μm, from the viewpoint of the thickness reduction. Such a thinned polarizer is preferable because it is small in thickness unevenness, excellent in visibility, and excellent in durability based on small dimensional changes, and is capable of facilitating thickness reduction of the polarizing film.

Typical examples of a thinned polarizer may include thinned polarizer films (polarizers) described in JP 51-069644A, JP 2000-338329A, WO 2010/100917A (PCT/JP 2010/001460), JP 2010-269002, and JP 2010-263692. These thinned polarizer films can be obtained by a production method comprising the steps of: stretching a polyvinyl alcohol-based resin (hereinafter also referred to as "PVA-based resin") layer and a stretching resin substrate in the form of a laminate; and dyeing the stretched PVA-based resin. In this production method, the PVA-based resin layer is supported by the stretching resin substrate, so that it becomes possible to stretch the PVA-based resin layer without any problem such as stretching-caused breakage, even when it is significantly thin.

As the thinned polarizer film, from a viewpoint of being able be stretched at a high ratio to thereby enhance polarization performance, a type obtainable by, among the production methods each comprising performing stretching and dyeing steps in a state of the laminate, a production method comprising a step of performing stretching in a boric acid aqueous solution as described in WO 2010/100917A (PCT/JP 2010/001460), JP 2010-269002, and JP 2010-263692, is preferable, and a type obtainable by a production method comprising a step of performing auxiliary in-air stretching before the stretching in a boric acid aqueous solution as described in JP 2010-269002, and JP 2010-263692.

The thinned polarizer film described in PCT/JP 2010/001460 is a thinned highly-functional polarizer film composed of a PVA-based resin integrally formed on a resin substrate and containing an oriented dichroic material, wherein the polarizer film has a thickness of 7 μm or less, and exhibits an optical property comprising a single transmittance of 42.0% or more and a polarization degree of 99.95% or more.

This thinned highly-functional polarizer film can be produced by: applying a PVA-based resin on a resin substrate having a thickness of at least 20 μm to form a PVA-based resin layer through drying; immersing the formed PVA-based resin layer in a dyeing solution containing a dichroic material to adsorb the dichroic material to the PVA-based resin layer; and stretching, together with the resin substrate, the PVA-based resin layer containing the adsorbed dichroic material, in a boric acid aqueous solution at a total stretching ratio of 5 times or more with respect to its original length.

A laminate film comprising a thinned highly-functional polarizer film containing an oriented dichroic material can also be produced by a production method comprising the steps of: forming a laminate film of a resin substrate having a thickness of at least 20 μm and a PVA-based resin layer formed by applying a PVA-based resin-containing aqueous solution to one surface of the resin substrate and drying the applied solution; immersing the laminate film of the resin substrate and the PVA-based resin layer formed on the one surface of the resin substrate, in a dyeing solution containing a dichroic material to thereby adsorb the dichroic material to the PVA-based resin layer of the laminate film; and stretching the laminate film comprising the PVA-based resin layer containing the adsorbed dichroic material, in a boric acid aqueous solution at a total stretch ratio of 5 times or more with respect to its original length, wherein, as a result of stretching the PVA-based resin layer containing the adsorbed dichroic material, together with the resin substrate, a laminate film of the resin substrate and a thinned highly-functional polarizer film composed of the PVA-based resin layer containing the oriented dichroic material and formed on one side of the resin substrate is produced, wherein the thinned highly-functional polarizer film has a thickness of 7 μm or less, and exhibits an optical property comprising a single transmittance of 42.0% or more and a polarization degree of 99.95% or more.

In the present invention, as a polarizer having a thickness of 10 μm or less, comprised in the adhesive layer and polarizing film combination structure, a continuous web of polarizer film composed of a PVA-based resin containing an oriented dichroic material may be employed, wherein the polarizer film is obtained by subjecting a laminate comprising a thermoplastic resin substrate and a polyvinyl alcohol-based resin layer formed on the substrate, to a two-stage stretching process consisting of auxiliary in-air stretching and in-boric-acid-solution stretching, as mentioned above. Preferably, the thermoplastic resin substrate is a non-crystallizable ester-based thermoplastic resin substrate or a crystallizable ester-based thermoplastic resin substrate.

Each of the thinned polarizer films described in JP 2010-269002, and JP 2010-263692 is a continuous web of polarizer film composed of a PVA-based resin containing an oriented dichroic material, wherein the polarizer film is obtained by subjecting a laminate comprising a non-crystallizable ester-based thermoplastic resin substrate and a PVA-based resin layer formed on the substrate, to a two-stage stretching process consisting of auxiliary in-air stretching and in-boric-acid-solution stretching to have a thickness of 10 μm or less. Preferably, this thin polarizer film is formed to have an optical property satisfying the following relationships: $P > -(10^{0.929T-42.4}-1) \times 100$ (where T<42.3) and P≥99.9 (where T≥42.3), wherein T denotes a single transmittance, and P denotes a polarization degree.

Specifically, the thinned polarizer film can be produced by a thinned polarizer film production method comprising the steps of: subjecting a continuous web of PVA-based resin layer formed on a non-crystallizable ester-based thermoplastic resin substrate, to elevated temperature in-air stretching to thereby form a stretched intermediate product composed of an oriented PVA-based resin layer; adsorbing a dichroic material (preferably, iodine or a mixture of iodine and an organic dye) to the stretched intermediate product to thereby form a dyed intermediate product composed of the PVA-based resin layer containing an oriented dichroic material; and subjecting the dyed intermediate product to in-boric-acid-solution stretching to thereby form a polarizer film composed of the PVA-based resin layer containing the oriented dichroic material, wherein the polarizer film has a thickness of 10 μm or less.

In this production method, a total stretching ratio of the PVA-based resin layer formed on the non-crystallizable ester-based thermoplastic resin substrate and subjected to the elevated temperature in-air stretching and the in-boric-acid-solution stretching is desirably set to 5 times or more. A solution temperature of the boric acid aqueous solution for the in-boric-acid-solution stretching may be set to 60° C. or more. It is desirable to subject the dyed intermediate product to an insolubilization treatment before stretching it in the boric acid aqueous solution. In this case, the dyed intermediate product is preferably immersed in a boric acid aqueous solution at a temperature of 40° C. or less. The non-crystallizable ester-based thermoplastic resin substrate may be non-crystallizable polyethylene terephthalate, such as isophthalic acid-copolymerized polyethylene terephthalate, cyclohexanedimethanol-copolymerized polyethylene terephthalate, or other copolymerized polyethylene terephthalate. This substrate is preferably composed of a transparent resin, and a thickness thereof may be set to at least seven times or more with respect to a thickness of the PVA-based resin layer to be formed thereon. The stretching ratio of the elevated temperature in-air stretching is preferably set to 3.5 times or less, and a stretching temperature of the elevated temperature in-air stretching is preferably set to be equal to or greater than a glass transition temperature of the PVA-based resin, specifically, the range of 95° C. to 150° C. In the case where the elevated temperature in-air stretching is performed by free-end uniaxial stretching, the total stretch ratio of the PVA-based resin layer formed on the non-crystallizable ester-based thermoplastic resin substrate is preferably set to 5 to 7.5 times. On the other hand, in the case where the elevated temperature in-air stretching is performed by fixed-free uniaxial stretching, the total stretch ratio of the PVA-based resin layer formed on the non-crystallizable ester-based thermoplastic resin substrate is preferably set to 5 to 8.5.

More specifically, the thinned polarizer film can also be produced by the following method.

A continuous web of substrate is prepared which is composed of isophthalic acid-copolymerized polyethylene terephthalate (non-crystallizable PET) copolymerized with isophthalic acid in an amount of 6 mol %. The non-crystallizable PET has a glass transition temperature of 75° C. A laminate of the continuous web of non-crystallizable PET substrate and a polyvinyl alcohol (PVA) layer is prepared in the following manner. For reference, PVA has a glass transition temperature of 80° C.

A 200 μm-thick non-crystallizable PET substrate, and a 4 to 5% PVA aqueous solution obtained by dissolving a PVA powder having a polymerization degree of 1,000 or more and a saponification degree of 99% or more in water, are prepared. Then, the PVA aqueous solution is applied to the 200 μm-thick non-crystallizable PET substrate and dried at a temperature of 50 to 60° C. to obtain a laminate of the non-crystallizable PET substrate and a 7 μm-thick PVA layer formed on the substrate.

The laminate comprising the 7 μm-thick PVA layer is formed into a 3 μm-thick thinned highly-functional polarizer film via a two-stage stretching process consisting of auxiliary in-air stretching and in-boric-acid-solution stretching. Through the first stage, i.e., auxiliary in-air stretching, the laminate comprising the 7 μm-thick PVA layer is stretched together with the non-crystallizable PET substrate to form a 5 μm-thick stretched laminate. Specifically, the stretched laminate is passed through a stretching apparatus placed in an oven having a stretching temperature environment set at 130° C., and subjected to free-end uniaxial stretching so as to attain a stretching ratio of 1.8 times. Through this stretching, the PVA layer comprised in the stretched laminate is changed to a 5 μm-thick PVA layer containing oriented PVA molecules.

Subsequently, through a dyeing step, a dyed laminate is formed in which iodine is adsorbed to the 5 μm-thick PVA layer containing oriented PVA molecules. Specifically, the dyed laminate is obtained by immersing the stretched laminate in a dyeing solution containing iodine and potassium iodide and having a solution temperature of 30° C., for an arbitrary time to thereby adsorb the iodine to the PVA layer, wherein the arbitrary time is set to allow a highly-functional polarizer film to be finally formed in such a manner that a PVA layer comprised in the highly-functional polarizer film has a single transmittance of 40 to 44%. In this step, the dyeing solution is adjusted using water as a solvent to allow an iodine concentration to fall with the range of 0.12 to 0.30 weight %, and allow a potassium iodide concentration to fall within the range of 0.7 to 2.1 weight %. A concentration ratio of iodine to potassium iodide is 1:7. For reference, dissolution of iodine in water requires potassium iodide. More specifically, the stretched laminate is immersed in a dyeing solution containing 0.30 weight % of iodine and 2.1 weight % of potassium iodide, for 60 seconds, to thereby form a dyed laminate in which iodine is adsorbed to the 5 μm-thick PVA layer containing oriented PVA molecules.

Further, through the second stage, i.e., in-boric-acid-solution stretching, the dyed laminate is further stretched together with the non-crystallizable PET substrate to form an optical film laminate comprising a 3 μm-thick PVA layer making up a highly-functional polarizer film. Specifically, this optical film laminate is formed by passing the dyed laminate through a stretching apparatus placed in a treatment system where a solution temperature of a boric acid aqueous solution containing boric acid and potassium iodide is set to 60 to 85° C., in such a manner as to be subjected to free-end uniaxial stretching so as to attain a stretching ratio of 3.3 times. More specifically, the solution temperature of the boric acid aqueous solution is 65° C. In the solution, the content of boric acid and the content of potassium iodide are set, respectively, to 4 weight parts and 5 weight parts, with respect to 100 weight parts of water. In this step, first of all, the dyed laminate containing iodine adsorbed in an adjusted amount is immersed in the boric acid aqueous solution for 5 to 10 seconds. Subsequently, the dyed laminate is directly passed between a plurality of sets of rolls each having a different circumferential speed and serving as the stretching apparatus placed in the treatment system, in such a manner as to be subjected to free-end uniaxial stretching by taking a time of 30 to 90 seconds so as to attain a stretching ratio of 3.3 times. Through this stretching, the PVA layer comprised in the dyed laminate is changed to a 3 μm-thick PVA layer in which the adsorbed iodine is highly oriented in one direction in the form of a polyiodide ion complex. This PVA layer composes a highly-functional polarizer film of the optical film laminate.

Although the following steps are not essential for the production of the optical film laminate, after extracting the optical film laminate from the boric acid aqueous solution, boric acid adhering to a surface of the 3 μm-thick PVA layer formed on the non-crystallizable PET substrate is preferably washed off through a cleaning step using a potassium iodide aqueous solution. Subsequently, the cleaned optical film laminate is dried through a drying step using warm air at 60° C. The cleaning step is intended to prevent an appearance defect such as precipitation of boric acid.

Although the following step is also not essential for the production of the optical film laminate, an 80 μm-thick triacetylcellulose film may be laminated to a surface of the 3 μm-thick PVA layer formed on the non-crystallizable PET substrate while an adhesive is applied to the surface, and then the non-crystallizable PET substrate may be peeled off in such a manner as to transfer the 3 μm-thick PVA layer to the 80 μm-thick triacetylcellulose film, through a lamination and/or transfer step.

[Additional Step]

The thinned polarizer film production method may further comprise an additional step other than the above steps. Examples thereof include an insolubilization step, a cross-linking step, and a drying step (adjustment of moisture rate). Such an additional step may be performed at arbitrary appropriate timing.

The insolubilization step is typically performed by immersing the PVA-based resin layer in a boric acid aqueous solution. Through an insolubilization treatment, water resistance can be imparted to the PVA-based resin layer. A concentration of boric acid in the boric acid aqueous solution is preferably set to 1 to 4 weight parts, with respect to 100 weight parts of water. An insolubilization bath (boric acid aqueous solution) preferably has a temperature of 20 to 50° C. Preferably, the insolubilization step is performed after the preparation of the laminate and before the dyeing step or the in-water stretching.

The cross-linking step is typically performed by immersing the PVA-based resin layer in a boric acid aqueous solution. Through the cross-linking treatment, water resistance can be imparted to the PVA-based resin layer. A concentration of boric acid in the boric acid aqueous solution is preferably set to 1 to 4 weight parts, with respect to 100 weight parts. In the case where the cross-linking step is performed after the dyeing step, an iodide is preferably added to the solution. The addition of an iodide makes it possible to suppress elution of iodine adsorbed to the PVA-based resin layer. An amount of addition of an iodide is preferably set to 1 to 5 weight parts, with respect to 100 weight parts of water. Specific examples of the iodide are as described above. A solution temperature of a cross-linking bath (boric acid aqueous solution) is preferably set to 20 to 50° C. Preferably, the cross-linking step is performed before the second in-boric-acid-solution stretching step. In a preferred embodiment, the dyeing step, the cross-linking step and the second in-boric-acid-solution stretching step are performed in this order.

As a material composing the transparent protective film, a thermoplastic resin is typically employed with a view point of being excellent in transparency, mechanical strength, thermal stability, water blocking property, isotropy and the like. Examples of the thermoplastic resin include: cellulose resins such as triacetylcellulose; polyester resins; polyethersulfone resins; polysulfone resins; polycarbonate resins; polyamide resins; polyimide resins; polyolefin resins; (meth)acrylic resins; cyclic polyolefin resins; (norbornene resins); polyarylate resins; polystyrene resins; polyvinyl alcohol resins; and mixtures thereof. The transparent protective film may be laminated to one side of the polarizer through an adhesive layer. In this case, a thermosetting or ultraviolet-curable resin such as a (meth)acryl-based, urethane-based, acrylic urethane-based, epoxy-based, or silicone-based resin may be employed as a transparent protective film for the other side. The transparent protective film may contain any one or more suitable additives. Examples of the additive include an ultraviolet absorber, an antioxidant, a lubricant, a plasticizer, a release agent, an anti-discoloration agent, a flame retardant, a nucleating agent, an antistatic agent, a pigment, and a colorant. The thermoplastic resin is preferably contained in the transparent protective film in an amount of 50 to 100 weight %, more preferably, 50 to 99 weight %, further more preferably, 60 to 98 weight %, particularly preferably, 70 to 97 weight %. If the content of the thermoplastic resin in the transparent protective film is less than 50 weight %, high transparency and other properties inherent in the thermoplastic resin become likely to fail to be sufficiently exhibited.

In order to meet the need for thickness reduction of the separator-attached adhesive layer and polarizing film combination structure, the thickness of the transparent protective film is preferably set to about 10 to 90 μm, more preferably, 15 to 60 μm, further more preferably, 20 to 50 μm.

As means to bond the polarizer and the transparent protective film together, an adhesive is employed. Examples of the adhesive may include isocyanate adhesives, polyvinyl alcohol-based adhesives, gelatin-based adhesives, vinyl-based latex adhesives, and aqueous polyester adhesives. The adhesive is generally used in the form of an adhesive aqueous solution, and generally contains 0.5 to 60 weight % of solid components. Other example of the adhesive between the polarizer and the transparent protective film include ultraviolet-curable adhesives and electron beam-curable adhesives. The electron beam-curable adhesive for a polarizing film exhibits suitable adhesiveness to the various types of transparent protective films. The adhesive for use in the present invention may also contain a metal compound filler.

The polarizing film can be laminated to a different type of optical film. Examples of the different optical film include a film serving as an optical layer for use in forming a liquid crystal display device or the like, such as a reflective plate, a semi-transmissive plate, a retardation plate (including a wavelength plate such as a ½ or ¼ wavelength plate), a vision compensation film, or a brightness enhancing film. In actual use, this film may be laminated to the polarizing film in such a manner as to form one or more layers.

The optical film composed of a laminate of the polarizing film and the optical layer(s) may be formed by a technique of sequentially laminating them one-by-one during a production process of a liquid crystal display device or the like.

However, an optical film preliminarily formed in the form of a laminate is excellent from a viewpoint of quality stability and assemblability and therefore has an advantage of being able to improve the production process of a liquid crystal display device or the like. For the lamination, any appropriate bonding means such as an adhesive layer may be employed. During an operation of bonding the polarizing film to a different type of optical layer, their optical axes may be arranged at an appropriate angle, depending on an intended retardation characteristic or the like.

The adhesive layer and polarizing film combination structure of the present invention may be preferably used to form various types of image display devices such as a liquid crystal display device. A liquid crystal display device may be formed according to conventional techniques. That is, a liquid crystal display device may be typically formed by: appropriately assembling a display panel such as a liquid crystal cell, an adhesive layer and polarizing film combination structure, and an optional component such as a lighting system, together, and then assembling a drive circuit thereto. This may also be applied to the present invention, except for the use of the adhesive layer and polarizing film combination structure of the present invention. As regards the liquid crystal cell, any type such as TN type, STN type, π type, VA type, or IPS type, may be employed.

Any type of liquid crystal display device, such as a liquid crystal display device in which the adhesive layer and polarizing film combination structure is disposed on at least one of opposite sides of a display panel such as a liquid crystal cell, or a liquid crystal display device using, as an illumination system, a backlight or a reflective plate, may be appropriately formed. In this case, the adhesive layer and polarizing film combination structure of the present invention may be provided on at least one of opposite sides of a display panel such as a liquid crystal cell. In the case where optical films are provided on respective opposite sides of the display panel, they may be identical to or different from each other. During formation of a liquid crystal display device, any type of component, such as a diffusion plate, an antiglare layer, an anti-reflective film, a protective plate, a prism array, a lens array sheet, a light diffusion plate, or a backlight, may be appropriately arranged at an appropriate position in such a manner as to form one or more layers.

EXAMPLES

Although the present invention will be described in detail below, based on examples, it should be understood that the present invention is not limited to such examples. In each example, "part(s)" and "%" means "weight part(s)" and "weight %", respectively.

<Measurement of Weight-Average Molecular Weight of (Meth)Acryl-Based Polymer>

A weight-average molecular weight of the hydroxyl group-containing (meth)acryl-based polymer (A) was measured by GPC (gel permeation chromatography). • Analyzer: HLC-8120GPC produced by Tosoh Corp. • Columns: G7000HXL, +GMHYL+GMH produced by Tosoh Corp. • Column size: each 7.8 mmφ×30 cm, 90 cm in total • Column temperature: 40° C. • Flow rate: 0.8 ml/min • Injection volume: 100 µl • Eluent: tetrahydrofuran • Detector: differential refractometer (RI) • Standard sample: polystyrene <Preparation of Polarizing Film (1)>

For preparing a thinned polarizer, first of all, a laminate of a non-crystallizable PET substrate and a 9 µm-thick PVA layer formed on the substrate was subjected to auxiliary in-air stretching at a stretching temperature of 130° C. to form a stretched laminate. Then, the stretched laminate was subjected to dyeing to form a dyed laminate, and the dyed laminate was subjected to in-boric-acid-solution stretching at a stretching temperature of 65° C. so as to attain a total stretching ratio of 5.94 times to thereby prepare an optical film laminate comprising a 4 µm-thick PVA layer stretched together with the non-crystallizable PET substrate. Through the above 2-stage stretching, an optical film laminate comprising a 4 µm-thick PVA layer could be prepared, wherein the PVA layer makes up a highly-functional polarizer in which PVA molecules of the PVA layer formed on the non-crystallizable PET substrate are highly oriented, and iodine adsorbed through the dyeing is highly oriented in one direction in the form of a polyiodide ion complex. Further, a 40 µm-thick acrylic resin film subjected to saponification treatment (transparent protective film (1)) was laminated to a surface of the polarizer of the optical film laminate while a polyvinyl alcohol-based adhesive is applied to the surface, and then the non-crystallizable PET substrate was peeled off to prepare a polarizing film using the thinned polarizer. This will hereinafter be referred to as "the thinned polarizing film (1)". Respective thicknesses of the polarizer and the transparent protective film and a total thickness thereof are presented in Table 1.

<Preparation of Polarizing Film (2)>

An 80 µm-thick polyvinyl alcohol film was stretched between rolls having different speed ratios, at a stretching ratio of 3 times, while being dyed in a 0.3% iodine solution at 30° C., for 1 minute. Then, the stretched film was further stretched to attain a total stretching ratio of 6 times while being immersed in an aqueous solution containing 4% of boric acid and 10% of potassium iodide at 60° C., for 0.5 minutes. Subsequently, the stretched film was washed by immersing it in an aqueous solution containing 1.5% of potassium iodide at 30° C., for 10 seconds and then dried at 50° C. for 4 minutes to obtain a 4 µm-thick polarizer. Further, a 40 µm-thick acrylic resin film subjected to saponification treatment (transparent protective film (1)) was laminated to one surface of the polarizer of the optical film laminate while a polyvinyl alcohol-based adhesive is applied to the one surface, and then after peeling off the non-crystallizable PET substrate, a 40 µm-thick norbornene-based film (transparent protective film (2)) was laminated to the other surface of the polarizer through a polyvinyl alcohol-based adhesive to prepare a polarizing film. This will hereinafter be referred to as "the thinned polarizing film (2)". Respective thicknesses of the polarizer and the transparent protective film and a total thickness thereof are presented in Table 1.

<Preparation of Polarizing Film (3)>

An 80 µm-thick polyvinyl alcohol film was stretched between rolls having different speed ratios, at a stretching ratio of 3 times, while being dyed in a 0.3% iodine solution at 30° C., for 1 minute. Then, the stretched film was further stretched to attain a total stretching ratio of 6 times while being immersed in an aqueous solution containing 4% of boric acid and 10% of potassium iodide at 60° C., for 0.5 minutes. Subsequently, the stretched film was washed by immersing it in an aqueous solution containing 1.5% of potassium iodide at 30° C., for 10 seconds and then dried at 50° C. for 4 minutes to obtain a 20 µm-thick polarizer. Further, the 40 µm-thick acrylic resin film subjected to saponification treatment (transparent protective film (1))

was laminated to one surface of the polarizer of the optical film laminate while a polyvinyl alcohol-based adhesive is applied to the one surface, and then after peeling off the non-crystallizable PET substrate, a 60 μm-thick norbornene-based film (transparent protective film (2)) was laminated to the other surface of the polarizer through a polyvinyl alcohol-based adhesive to prepare a polarizing film. This will hereinafter be referred to as "the thinned polarizing film (3)". Respective thicknesses of the polarizer and the transparent protective film and a total thickness thereof are presented in Table 1.

Production Example 3

Preparation of (Meth)Acryl-Based Polymer (A-3)

Except that 100 parts of butyl acrylate was used in Production Example 1, a solution of a (meth)acryl-based polymer (A-4) having a weight-average molecular weight of 1,600,000 was prepared in the same manner as in Production Example 1. A composition and molecular weight of the (meth)acryl-based polymer (A-4) are presented in Table 2.

TABLE 1

| | Type of Film | Polarizer (μm) | Transparent protective film 1 (μm) | Transparent protective film 2 (μm) | Total thickness (μm) |
|---|---|---|---|---|---|
| Configuration Example 1 | Thinned polarizing film (1) | 4 | 40 | — | 44 |
| Configuration Example 2 | Thinned polarizing film (2) | 4 | 40 | 40 | 84 |
| Configuration Example 3 | Thinned polarizing film (3) | 20 | 40 | 60 | 120 |

Production Example 1

Preparation of (Meth)Acryl-Based Polymer (A-1)

99 parts of butyl acrylate and 1 part of 4-hydroxybutyl acrylate (HBA) were put in a reaction vessel equipped with a condenser tube, a nitrogen introducing tube, a thermometer, and a stirrer. Further, with respect to 100 parts of the monomers (solid components), 1 part of AIBN serving as an initiator was added thereto together with ethyl acetate. The resulting mixture was subjected to reaction at 60° C. for 7 hours under a nitrogen gas stream. Subsequently, ethyl

TABLE 2

| | Butyl acrylate (BA) | 4-hydroxybutyl acrylate (HBA) | 2-hydroxyethyl acrylate (HEA) | Molecular weight |
|---|---|---|---|---|
| Production Example 1 (A-1) | 99 | 1 | 0 | 160 |
| Production Example 2 (A-2) | 99 | 0 | 1 | 160 |
| Production Example 3 (A-3) | 100 | 0 | 0 | 160 | acetate was added to the reaction solution to obtain a solution containing a hydroxyl group-containing (meth) acryl-based polymer (A-1) having a weight-average molecular weight of 1,600,000 (solid concentration: 30 weight %). A composition and molecular weight of the (meth)acryl-based polymer (A-1) are presented in Table 2.

Production Example 2

Preparation of (Meth)Acryl-Based Polymer (A-2)

Except that a monomer mixture containing 99 parts of butyl acrylate and 1 parts of 2-hydroxyethyl acrylate (HEA) was used in Production Example 1, a solution of a (meth) acryl-based polymer (A-2) having a weight-average molecular weight of 1,600,000 was prepared in the same manner as in Production Example 1. A composition and molecular weight of the (meth)acryl-based polymer (A-2) are presented in Table 2.

Inventive Example 1

Preparation of Optical Adhesive Composition

With respect to 100 parts of solid components in a solution of the (meth)acryl-based polymer (A-1) produced in Production Example 1, 0.1 parts of trimethylolpropane xylylene diisocyanate (Takenate D110N produced by Mitsui Chemicals, Inc.) and 0.3 pars of dibenzoyl peroxide (C-2) each serving as a cross-linking agent, 0.075 parts of γ-glycidoxypropylmethoxysilane (D; KBM-403 produced by Shin-Etsu Chemical Co., Ltd.), and 0.3 parts of pentaerythritol tetrakis[3-(3,5-di-tert-butyl-4-hydroxyphenyl)propionate) (B-1; IRGANAOX 1010 produced by BASF Japan Ltd.) i.e., a peel force adjuster serving as a phenol-based antioxidant, were added to the (meth)acryl-based polymer (A-1) to obtain an adhesive composition.

(Preparation of Separator-Attached Adhesive Layer and Polarizing Film Combination Structure)

The adhesive composition was uniformly applied to a silicone-based release agent-treated surface of a polyethylene terephthalate film (backing), using a fountain coater (first step), and then dried in an air circulation-type constant-temperature oven at 155° C. for 2 minutes to form a 20 μm-thick adhesive layer on the surface of the backing (second step). Subsequently, a separator film (MRF 39 produced by Mitsubishi Polyester Film Inc.) formed with the adhesive layer was attached to the polarizing film to form a separator-attached adhesive layer and polarizing film combination structure.

Inventive Examples 2 to 12 and Comparative Examples 1 to 7

Except that the amount of each component was changed as presented in Table 1 in the operation of preparing the adhesive composition, and the type of polarizing film was changed as presented in Table 1 in the operation of preparing the separator-attached adhesive layer and polarizing film combination structure, in Production Example 1, respective separator-attached adhesive layer and polarizing film combination structures were prepared in the same manner as in Example 1. It should be noted that, in Comparative Example 4, tris(2,4-di-tert-butylphenyl)phosphite (B-2; IRGAFOS 168 produced by BASF Japan Ltd.) was used as a peel force adjuster serving as a phenol-based antioxidant.

Inventive Example 13

Except that the heating temperature (equivalent to a temperature of the air circulation-type constant-temperature oven in the second step) was changed to 130° C., a separator-attached adhesive layer and polarizing film combination structure was prepared in the same manner as that in Inventive Example 1.

Inventive Example 14

Except that the heating temperature (equivalent to a temperature of the air circulation-type constant-temperature oven in the second step) was changed to 90° C., a separator-attached adhesive layer and polarizing film combination structure was prepared in the same manner as that in Inventive Example 1.

The separator-attached adhesive layer and polarizing film combination structures obtained in the above Inventive and Comparative Examples were subjected to the following evaluations. A result of the evaluations is presented in Table 3.

<Measurement of Gel Fraction>

Each of the adhesive compositions before preparation of samples was applied to a silicone-treated polyethylene terephthalate film in such a manner as to allow a thickness thereof after drying to become 20 μm, and then subjected to curing under the same conditions (temperature and time) in each Example to form an adhesive layer. Subsequently, the adhesive layer was left under conditions comprising at a temperature of 23° C. and a humidity of 65% RH, for 1 hour, and subjected measurement of gel fraction. The gel fraction was measured in the following manner. About 0.2 g of the adhesive layer was taken and wrapped by a fluororesin (TEMISHNTF-1122 produced by Nitto Denko Corp.) whose weight (Wa) was preliminarily measured. Then, after binding the fluororesin so as to prevent leakage of the adhesive layer, the weight (Wb) of the wrapped body was measured. The wrapped body was immersed in about 40 ml of ethyl acetate at 23° C. for 7 days to extract soluble components therefrom. Subsequently, wrapped body, i.e., the fluororesin wrapping the adhesive layer, was taken out, and dried at 130° C. for 2 hours on an aluminum cup. Then, the weight (Wc) of the wrapped body after removal of the soluble components was measured. The gel fraction (weight %) of the adhesive layer was calculated from the above measurement values according to the following formula.

Gel Fraction (weight %)=$\{(Wc-Wa)/(Wb-Wa)\} \times 100$

<Adhesive Force with Respect to Glass>

Each of the separator-attached adhesive layer and polarizing film combination structures contained in the Inventive and Comparative Examples was subjected to aging at room temperature for 7 days. Subsequently, the separator was peeled off from the polarizing film, and the polarizing film was laminated to a non-alkali glass plate through the adhesive layer thereof. Then, the polarizing film was pulled in a direction at 90 degrees with respect to the glass plate and at a speed of 300 mm/min by using a peel tester to measure an adhesive force (adhesive force) of the adhesive layer. Autograph produced by Shimadzu Corp., was used in the peel tester.

[Evaluation of Durability]

<Durability Test of Separator-Attached Adhesive Layer and Polarizing Film Combination Structure (Peeling or Foaming)>

After peeling off the separator film of the separator-attached adhesive layer and polarizing film combination structure obtained in each of the Inventive and Comparative Examples was peeled off, the polarizing film is laminated to a non-alkali glass through the exposed adhesive layer. Subsequently, the resulting sample was subjected to an autoclave treatment at 50° C. and 5 atm for 15 minutes, and put into a heating oven at 85° C. and a constant-temperature and constant-humidity unit at 60° C. and 90% RH.

Then, after elapse of 500 h, the presence or absence of peeling and foaming of the polarizing film was visually observed. A sample in which neither peeling nor foaming was observed and a sample in which only a visually indeterminable level of peeling or foaming was observed were evaluated, respectively, as ⊚ and ○, and a sample in which visually determinable small peeling or foaming was observed, and a sample in which apparent peeling or foaming was observed were evaluated, respectively, as Δ and x.

<Processability>

Within 24 hours after preparing the above sample, a piece punched into a square shape having a one-side length of 270 mm was evaluated by visual observation and by touch feeling to determine whether or not a side edge of the polarizing plate had a sticky feeling and whether or not a surface of the polarizing plate was stained by the adhesive.

⊚: No stain due to the adhesive was observed.
○: Strain was observed but at a practically allowable level.
x: There was a sticky feeling, and strain was observed.

<Peel Force with Respect to Separator>

The sample of the separator-attached adhesive layer and polarizing film combination structure obtained in each of the Inventive and Comparative Examples was cut into a size of 50 mm width×100 mm length to obtain a sample piece, and a peel force (N/50 mm-width) during an operation of peeling off the separator from the sample piece at a peel angle of 180° and a peel rate of 300 mm/min by using a peel tester was measured.

<Work Efficiency of Separator Peeling>

The sample of the separator-attached adhesive layer and polarizing film combination structure obtained in each of the Inventive and Comparative Examples was evaluated in terms of a state during an operation of manually peeling off the separator film, and the presence or absence of lifting of the separator film in an edge region of the sample, by the following criteria.

⊚: None of ten pieces of the sample failed peeling.
○: One of ten pieces of the sample failed peeling. Specifically, in the one sample, lifting of the separator film in the edge region was visually observed.
x: Two or more of ten pieces of the sample failed peeling. Specifically, in the two or more samples, lifting of the separator film in the edge region was visually observed.

TABLE 3

| | | Pressure-Sensitive Adhesive composition | | | | | | | | | |
|---|---|---|---|---|---|---|---|---|---|---|---|
| | | (meth)acryl-based polymer | | Peel force adjuster | | Cross-linking agent | | | | Silane coupling agent | |
| | | | | | | Peroxide | | isocyanate-based | | | |
| | Polarizing film | Type | Part(s) | Type | Part(s) | Type | Part(s) | Type | Part(s) | Type | Part(s) |
| Inventive Example 1 | Configuration Example 1 | A-1 | 100 | B-1 | 0.3 | C-2 | 0.3 | C-1 | 0.1 | D | 0.075 |
| Inventive Example 2 | Configuration Example 1 | A-1 | 100 | B-1 | 0.1 | C-2 | 0.3 | C-1 | 0.1 | D | 0.075 |
| Inventive Example 3 | Configuration Example 1 | A-1 | 100 | B-1 | 1.5 | C-2 | 0.3 | C-1 | 0.1 | D | 0.075 |
| Inventive Example 4 | Configuration Example 1 | A-1 | 100 | B-1 | 0.05 | C-2 | 0.3 | C-1 | 0.1 | D | 0.075 |
| Inventive Example 5 | Configuration Example 1 | A-1 | 100 | B-1 | 2.5 | C-2 | 0.3 | C-1 | 0.1 | D | 0.075 |
| Inventive Example 6 | Configuration Example 1 | A-1 | 100 | B-1 | 0.3 | C-2 | 0.2 | C-1 | 0.1 | D | 0.075 |
| Inventive Example 7 | Configuration Example 1 | A-1 | 100 | B-1 | 0.3 | C-2 | 0.5 | C-1 | 0.1 | D | 0.075 |
| Inventive Example 8 | Configuration Example 1 | A-1 | 100 | B-1 | 0.3 | C-2 | 0.8 | C-1 | 0.1 | D | 0.075 |
| Inventive Example 9 | Configuration Example 1 | A-2 | 100 | B-1 | 0.3 | C-2 | 0.3 | C-1 | 0.1 | D | 0.075 |
| Inventive Example 10 | Configuration Example 1 | A-3 | 100 | B-1 | 0.3 | C-2 | 0.3 | C-1 | 0.1 | D | 0.075 |
| Inventive Example 11 | Configuration Example 2 | A-1 | 100 | B-1 | 0.3 | C-2 | 0.3 | C-1 | 0.1 | D | 0.075 |
| Inventive Example 12 | Configuration Example 3 | A-1 | 100 | B-1 | 0.3 | C-2 | 0.3 | C-1 | 0.1 | D | 0.075 |
| Inventive Example 13 | Configuration Example 1 | A-1 | 100 | B-1 | 0.3 | C-2 | 0.3 | C-1 | 0.1 | D | 0.075 |
| Inventive Example 14 | Configuration Example 1 | A-1 | 100 | B-1 | 0.3 | C-2 | 0.3 | C-1 | 0.1 | D | 0.075 |
| Comparative Example 1 | Configuration Example 1 | A-1 | 100 | B-1 | 0 | C-2 | 0.3 | C-1 | 0.1 | D | 0.075 |
| Comparative Example 2 | Configuration Example 1 | A-1 | 100 | B-1 | 0 | C-2 | 0.03 | C-1 | 0.1 | D | 0.075 |
| Comparative Example 3 | Configuration Example 1 | A-1 | 100 | B-1 | 0 | C-2 | 2.5 | C-1 | 0.1 | D | 0.075 |
| Comparative Example 4 | Configuration Example 1 | A-1 | 100 | B-1 | 0.3 | C-2 | 0.3 | C-1 | 0.1 | D | 0.075 |
| Comparative Example 5 | Configuration Example 1 | A-2 | 100 | B-1 | 0 | C-2 | 0.3 | C-1 | 0.1 | D | 0.075 |
| Comparative Example 6 | Configuration Example 1 | A-3 | 100 | B-1 | 0 | C-2 | 0.3 | C-1 | 0.1 | D | 0.075 |
| Comparative Example 7 | Configuration Example 3 | A-1 | 100 | B-1 | 0 | C-2 | 0.3 | C-1 | 0.1 | D | 0.075 |

| | Heating Conditions | | Pysical Properties | Evaluation | | Separator peelability | | Durability | |
|---|---|---|---|---|---|---|---|---|---|
| | | | | Adhesive force to | | Peel force | | | Humidi- |
| | Heating temperature | Heating time (sec) | Gel fraction (%) | glass plate (N25 cm-width) | Process-ability | of separator (N50 cm-width) | Peeling work efficiency | Heating (80° C.) | fication (60° C./ 90% RH) |
| Inventive Example 1 | 155 | 120 | 90 | 3.3 | ◎ | 0.14 | ◎ | ◎ | ◎ |
| Inventive Example 2 | 155 | 120 | 69 | 3.6 | ◎ | 0.15 | ◎ | ◎ | ○ |
| Inventive Example 3 | 155 | 120 | 60 | 2.6 | ○ | 0.09 | ◎ | ◎ | ◎ |
| Inventive Example 4 | 155 | 120 | 64 | 3.8 | ○ | 0.18 | ○ | ○ | ○ |
| Inventive Example 5 | 155 | 120 | 50 | 2 | ○ | 0.08 | ◎ | ◎ | ◎ |
| Inventive Example 6 | 155 | 120 | 56 | 3.4 | ○ | 0.1 | ◎ | ◎ | ◎ |
| Inventive Example 7 | 155 | 120 | 75 | 3.5 | ◎ | 0.2 | ○ | ◎ | ◎ |
| Inventive Example 8 | 155 | 120 | 77 | 3.6 | ◎ | 0.29 | ○ | ◎ | ○ |

TABLE 3-continued

| | | | | | | | | | |
|---|---|---|---|---|---|---|---|---|---|
| Inventive Example 9 | 155 | 120 | 73 | 3.5 | ◉ | 0.14 | ◉ | ○ | ◉ |
| Inventive Example 10 | 155 | 120 | 72 | 3.5 | ◉ | 0.14 | ◉ | ○ | ○ |
| Inventive Example 11 | 155 | 120 | 74 | 3.5 | ◉ | 0.14 | ◉ | ◉ | ◉ |
| Inventive Example 12 | 155 | 120 | 74 | 3.5 | ◉ | 0.14 | ◉ | ◉ | ◉ |
| Inventive Example 13 | 130 | 120 | 60 | 3.4 | ○ | 0.07 | ◉ | ◉ | ◉ |
| Inventive Example 14 | 90 | 120 | 40 | 3.2 | ○ | 0.05 | ◉ | ○ | ○ |
| Comparative Example 1 | 155 | 120 | 60 | 3.5 | ○ | 0.18 | ○ | X | ◉ |
| Comparative Example 2 | 155 | 120 | 5 | 2.9 | X | 0.04 | X | X | ○ |
| Comparative Example 3 | 155 | 120 | 79 | 3.7 | ◉ | 0.7 | X | X | X |
| Comparative Example 4 | 155 | 120 | 60 | 3.4 | ○ | 0.18 | ○ | Δ | ◉ |
| Comparative Example 5 | 155 | 120 | 60 | 3.5 | ○ | 0.18 | ○ | X | ○ |
| Comparative Example 6 | 155 | 120 | 60 | 3.5 | ○ | 0.18 | ○ | X | Δ |
| Comparative Example 7 | 155 | 120 | 60 | 3.5 | ○ | 0.18 | ◉ | X | ◉ |

The result in Table 3 show that the separator-attached adhesive layer and polarizing film combination structure using the separator-attached adhesive layer structure produced by the separator-attached adhesive layer structure production method in each of Inventive Examples 1 to 12 is excellent in peeling work efficiency, and excellent in durability and processability.

Considering a comparison between Inventive Example 12 and Comparative Example 7, in the separator-attached adhesive layer and polarizing film combination structures each comprising a polarizing film having a relatively large thickness, there is no significant difference in the peeling work efficiency, irrespective of the presence or absence of the peel force adjuster. On the other hand, as is evidenced from a comparison between Inventive Example 1 and Comparative Example 1, in the separator-attached adhesive layer and polarizing film combination structures each comprising a polarizing film having a relatively small thickness, the presence or absence of the peel force adjuster gives rise to a large difference in the peeling work efficiency.

[Relationship Between Peel Force and Dropping]

In order to clarify a relationship between the peel force of the separator with respect to the polarizing film and dropping of the polarizing film from the stage in the separator peeling step, in the present invention, the following experimental test was performed.

<Preparation of Polarizer Film>

A method for preparing a polarizer film comprised in a polarizing film used in this test will be described below. It is to be understood that any polarizer film other than that prepared by the following method may be used in the present invention. An A-PET (amorphous-polyethylene terephthalate) film (produced by Mitsubishi Plastics, Inc., trade name: NOVACLEAR SH046, 200 μm) was preliminarily prepared as a substrate, and a surface thereof was subjected to a corona treatment (58 W/m²/min). Further, PVA (polymerization degree: 4,200, saponification degree: 99.2%) added with 1 wt % of an acetoacetyl-modified PVA (produced by Nippon Synthetic Chemical Industry Co., Ltd., trade name: GOHSEFIMER Z200 (polymerization degree: 1,200, saponification degree: 99.0% or more, acetoacetyl modification degree: 4.6%)) was preliminarily prepared, and applied to the corona-treated surface of the substrate in such a manner as to allow a thickness of the resulting film after drying to become 12 μm. Then, the film was dried by hot air in an atmosphere at 60° C. for 10 minutes to prepare a laminate of the substrate and a PVA-based resin layer provided on the substrate.

Subsequently, the laminate was stretched in air at 130° C. at a stretching ratio of 2.0 times, to form a stretched laminate. Then, a step of immersing the stretched laminate in an insolubilizing boric acid aqueous solution at a solution temperature of 30° C. for 30 seconds to insolubilize a PVA layer comprised in the stretched laminate and containing oriented PVA molecules was performed. The insolubilizing boric acid aqueous solution in this step contained 3 weight % of boric acid with respect to 100 weight % of water. This stretched laminate was dyed to form a dyed laminate. This dyed laminate was obtained by immersing the stretched laminate in a dyeing solution containing iodine and potassium iodide and having a solution temperature of 30° C., to adsorb iodine to the PVA layer comprised in the stretched laminate in such a manner as to allow a PVA layer constituting a highly-functional polarizer film as a final product to have a single transmittance of 42.5%. In this step, an iodine concentration and a potassium iodide in the dyeing solution were set, respectively, in the range of 0.08 to 0.25 weight % and in the range of 0.56 to 1.75 weight %, using water as a solvent. A concentration ratio of iodine to potassium iodide was set to 1:7. Subsequently, a step of immersing the dyed laminate in a cross-linking boric acid aqueous solution at 30° C. for 60 minutes to subject PVA molecules of the PVA layer having iodine adsorbed thereto, to a cross-linking treatment, was performed. In the cross-linking boric acid aqueous solution in this step contained, boric acid was contained in an amount of 3 weight %, with respect to 100 weight % of water, and potassium iodide was contained in an amount of 3 weight %, with respect to 100 weight % of water. Then, the obtained dyed laminate was further stretched in a boric acid aqueous solution at a stretching temperature of 70° C. in the same direction as that in the previous in-air stretching, at a stretching ratio of 2.7 times to obtain a sample polarizer film having an ultimate total stretching ratio of 5.4 times. In the cross-linking boric acid aqueous solution used in this step, boric acid was contained in an amount of 4.0 weight %, with respect to 100 weight % of water, and potassium iodide was contained in an amount of 5 weight %, with respect to 100 weight % of water. The obtained optical film laminate was taken out from the boric acid aqueous solution, and boric acid adhering on a surface of the PVA layer was washed away by an aqueous solution containing 4 weight % of potassium iodide, with respect to 100 weight % of water. The washed optical film laminate was dried through a drying step using a hot air at 60° C. to obtain a 5 μm-thick polarizer film laminated to the A-PET film, and the polarizer film was subjected to aging at normal temperatures for 7 days. Thickness measurement was performed using a digital micrometer (KC-351C produced by Anritsu Corporation). (The aftermentioned thickness measurement of a protective film was performed in the same manner.) In the present invention, the thickness of the polarizer film may be any suitable value other than 5 μm. For example, the thickness may be 10 μm or less, preferably, 8 μm less, particularly preferably, 6 μm or less. By reducing the thickness of the polarizer film in this manner, it becomes possible to lower expansion and contraction forces which would occur in the polarizer film due to surrounding environmental changes. In the case where the polarizer film has a relatively large thickness, expansion and contraction forces occurring in the polarizer film become large, and thereby it is necessary to laminate a protective layer or a retardation layer having a thickness enough to suppress expansion and contraction of the polarizer film. In contrast, by reducing the thickness of the polarizer film to lower expansion and contraction forces which would occur in the polarizer film, the protective layer or the retardation layer to be laminated to the polarizer film can be designed such that it has a reduced thickness, thereby making it possible to reduce an overall thickness of the optical laminate. In addition, the reduction in thickness of the polarizer film and the lowering in expansion and contraction forces which would occur in the polarizer film due to surrounding environmental changes have an advantageous effect of lowering a stress which would occur between the polarizer film and a member laminated thereto, and thus suppressing an optical distortion which would occur in the laminated member.

A single transmittance and a polarization degree of the polarizer film obtained by the above method were measured in the following manner. A single transmittance T, a parallel transmittance Tp and a crossed transmittance Tc of the polarizer film were measured using a UV-visible spectrophotometer (V7100 produced by JASCO Corp.). Each value of T, Tp and Tc is a Y value measured by the 2-degree visual field (C light source) of JIS Z8701 and corrected for spectral luminous efficacy. The measurement was performed in a state in which a protective layer (acrylic-based resin film or cycloolefin-based resin film) was laminated to the polarizer film to facilitate handling of the polarizer film. Light absorption of the protective layer is negligibly small as compared to light absorption of the polarizer film. Thus, a transmittance of the laminate was determined as a transmittance of the polarizer film. The polarization degree P is calculated from the above transmittances by using the following formula Polarization degree $P\ (\%) = \{(Tp-Tc)/(Tp+Tc)\}^{1/2} \times 100$ The polarizer film obtained by the above method was 42.5%, and the polarization degree was 99% or more. However, in the present invention, each of the single transmittance and the polarization degree of the polarizer film may be set to a value other than the above value. For example, the single transmittance of the polarizer film may be set to, but not limited to, 40.0% or more, preferably, 41.0% or more, more preferably, 41.5% or more, particularly preferably, 42.0% or more. The polarization degree of the polarizer film may be set to, but not limited to, 99.8% or more, preferably, 99.9% or more, more preferably, 99.95% or more, particularly preferably, 99.99% or more.

<Preparation of Protective Film>

As a protective layer for protecting the polarizer film, any suitable resin film may be employed. Examples of a material for the protective film: a cycloolefin-based resin such as a norbornene-based resin; an olefin-based resin such as polyethylene or polypropylene; a polyester-based resin; and a (meth)acryl-based resin. As used herein, the term "(meth)acryl-based resin" means an acryl-based resin and/or a methacryl-based resin. Although a thickness of the protective layer is typically 10 to 50 μm, preferably, 15 to 45 μm, it may be any other suitable value. In this test, a 20 μm-thick (meth)acryl-based resin was employed.

Inventive Example A

The 5 μm-thick polarizer film laminated on the A-PET film was preliminarily prepared in the above manner, and the 20 μm-thick acryl-based protective film prepared in the above manner was laminated to a surface of the polarizer film on a side opposite to the A-PET film, through a light-curable adhesive. Then, the PET film was peeled off from this laminate to obtain a polarizing film composed of the polarizer film and the protective film. Then, a separator (trade name: Cerapeel, thickness: 38 μm) produced by Toray Advanced Film Co., Ltd., was laminated to a polarizer film-side surface of the polarizing film composed of the polarizer film and the protective film, through the same 20 μm-thick acryl-based adhesive layer as that in Inventive Example 1, and stored for 2 days. Subsequently, in order to reduce an adhesive force of the adhesive layer, the separator was peeled off once, and then the peeled separator was re-laminated. Then, a brightness enhancing film (trade name: APF, thickness: 20 μm) produced by Sumitomo 3M Ltd., was laminated to a protective film-side surface of the polarizing film composed of the polarizer film and the protective film, through a 5 μm-thick acryl-based adhesive layer to prepare a polarizing plate 1 as Inventive Example A.

Inventive Example B

The polarizing plate 1 prepared as Inventive Example A was stored at normal temperature for 1 month, to prepare a polarizing plate 2 as Inventive Example B.

Inventive Example C

The polarizing plate 1 prepared as Inventive Example A was stored at normal temperature for 3 months, to prepare a polarizing plate 3 as Inventive Example C.

Inventive Example D

The 5 μm-thick polarizer film laminated on the A-PET film was preliminarily prepared in the above manner, and a 40 μm-thick acryl-based protective film was laminated to a surface of the polarizer film on a side opposite to the A-PET film, through a light-curable adhesive. Then, the PET film was peeled off from this laminate to obtain a polarizing film composed of the polarizer film and the protective film. Then, the same separator (thickness: 38 μm) as that in Inventive Example A was laminated to a polarizer film-side surface of the polarizing film composed of the polarizer film and the protective film, through the same 20 μm-thick acryl-based adhesive layer as that in Inventive Example 1, and stored for 2 days. Subsequently, the separator was peeled off once, and then the peeled separator was re-laminated. Then, the same brightness enhancing film (thickness: 30 μm) was laminated to a protective film-side surface of the polarizing film composed of the polarizer film and the protective film, through a 5 μm-thick acryl-based adhesive layer to prepare a polarizing plate 4 as Inventive Example D.

Inventive Example E

Except that the operation of peeling off the separator once and then re-laminating the peeled separator was omitted, and an amount of peroxide in the adhesive was reduced from 0.3 parts to 0.2 parts, a polarizing plate 5 as Inventive Example E was prepared in the same manner as that in Inventive Example A.

Inventive Example F

Except that the operation of peeling off the separator once and then re-laminating the peeled separator was omitted, and an amount of peroxide in the adhesive was reduced from 0.3 parts to 0.17 parts, a polarizing plate 6 as Inventive Example F was prepared in the same manner as that in Inventive Example D.

Comparative Example A

Except that the operation of peeling off the separator once and then re-laminating the peeled separator was omitted, a polarizing plate 7 as Comparative Example A was prepared in the same manner as that in Inventive Example A.

Comparative Example B

Except that the operation of peeling off the separator once and then re-laminating the peeled separator was omitted, a polarizing plate 8 as Comparative Example B was prepared in the same manner as that in Inventive Example D.

<Peel Force with Respect to Separator>

In the present invention, an adhesive force of the adhesive is defined using an index obtained by measuring a peel force, i.e., a force required for peeling off the separator from the polarizing film. For this purpose, measurement of a peel force of the separator with respect to the polarizing film was performed in the following manner. The measurement was performed in a test environment including a temperature of 23±2° C. and a humidity of 65±15%. Autograph produced by Shimadzu Corp., was used in a peel tester to measure the peel force. This peel tester is a tensile tester defined in or consistent with JIS B7221. Each of the polarizing plates in the Inventive Examples A to E and the Comparative Examples A to C was cut into a size of 150 mm length×50 mm width to obtain a sample for the measurement. Further, a peel test-dedicated jig 100 illustrated in FIG. 1 was preliminarily prepared. This jig 100 comprises a metal plate 101, a clip 102 attached to the metal plate 101 and configured to fix the polarizing plate. A leading tape 210 attachable to the separator to lead the separator in a peeling direction thereof so as to cause the separator to be peeled from the polarizing plate was also preliminarily prepared.

Figure 2:
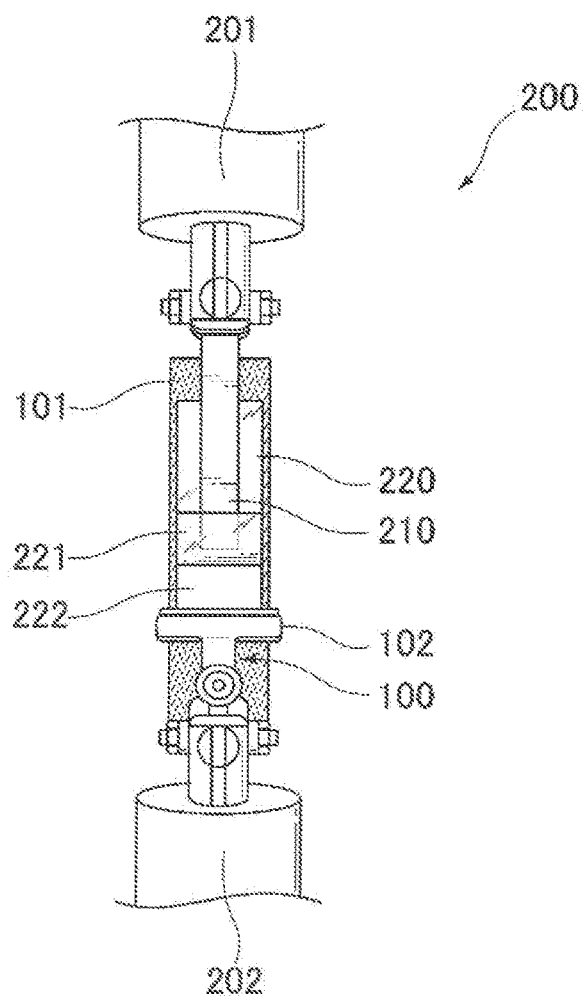
FIG. 2 is a schematic diagram illustrating a state of an experiment for measuring a peel force.

FIG. 2 illustrates a state of the peel force measurement in this test. A peel tester 200 used in this test comprises an upper unit 201 and a lower unit 202, wherein it is configured to hold one end and the other end of a peel-force measurement target, respectively, by the upper unit and the lower unit, and measure a force required for the upper unit to move upwardly, thereby determining a peel force. Specifically, first of all, one end of the leading tape 210 was held by the upper unit 201 of the peel tester in such a manner as to allow a front surface of the leading tape 210 in FIG. 2 to be an adhesive surface. Then, the peel test-dedicated jig 100 was fixed to the lower unit 202 of the peel tester. In this state, a mouth of the clip 102 of the jig was oriented upwardly as illustrated in FIG. 2. In a separator 221 in a sample 220 of the polarizing plate as the measurement target, a portion thereof corresponding to 20 mm in its overall length of 150 mm was manually peeled in advance. Then, in a state in which the separator 221 was located to face frontwardly in FIG. 2, a region 222 of the polarizing plate from which the separator had been peeled was clamped by the clip 102 of the peel test-dedicated jig 100, and the portion of the separator 221 peeled from the polarizing plate was attached onto the adhesive surface of the leading tape 210. Then, the upper unit 201 of the peel tester was moved upwardly to lead the separator upwardly (i.e., in a direction at 180 degree with respect to a downwardly-extending direction of the separator adhesively attached to the polarizer film before the manual peeling) and peel the separator from the polarizing plate while measuring a peel force. A peel rate was set to 300 mm/min.

<Peel Force with Respect to Glass Plate>

Measurement of an adhesive force of the adhesive with respect to a glass plate was performed in the same test environment and the same peel tester as those in the measurement of the peel force with respect to the separator. A polarizing plate as a measurement target was cut into a size of 25 mm×100 mm, and the separator was peeled to expose the polarizing film. Then, the bared adhesive layer was attached to a non-alkali glass plate.

Subsequently, the leading tape was held by the upper unit of the peel tester in the same manner as that in the measurement of the peel force with respect to the separator. A portion of the polarizing film corresponding to 20 mm in its overall length of 100 mm was manually peeled in advance. Then, the glass plate was fixed to the lower unit of the peel tester in a horizontal posture where a surface on which the polarizing plate had been attached was oriented upwardly, and the portion of the polarizing plate peeled from the glass plate was attached onto the leading tape. Then, the upper unit of the peel tester was moved upwardly to lead the polarizing plate upwardly (i.e., in a direction at 90 degree with respect to the horizontal direction) and peel the polarizing plate from the glass plate while measuring a peel force. The peel rate was set to 300 mm/min.

<Inspection of Peel-Off of Separator>

Figure 3:
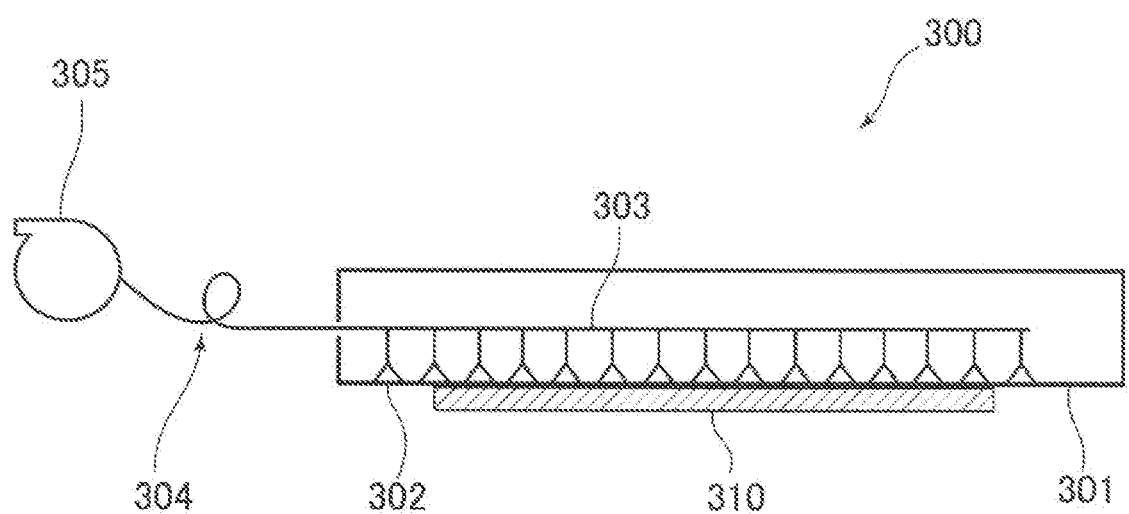
FIG. 3 is a schematic diagram illustrating a suction fixing device and a sample of a polarizing plate.

In order to inspect whether a problem actually occurs during the operation of peeling off the separator from the polarizing plate, a sample 310 of each polarizing plate was subjected to the following test using a suction fixing device 300 illustrated in FIG. 3. The suction fixing device 300 comprises: a suction stage 301 provided with a plurality of suction ports 302; an air passage 303 provided inside the suction stage 301 and communicated with the suction ports 302; an air pipe 304 connected to an outlet of the air passage; and a vacuum pump 305 connected to a distal end of the air pipe. The suction fixing device 300 is configured to suck air from the suction ports 302 via the air pipe 304 and the air passage 303 by the vacuum pump 305, to thereby generate a suction force. This suction force allows the sample 310 of the polarizing plate placed on the suction stage 301 to be fixed to a surface of the suction stage 301. As illustrated in FIG. 3, in a state in which a surface of the brightness enhancing film of the sample 310 of the polarizing plate was suckingly fixed to the suction stage disposed in a posture where each of the suction ports 302 was opened downwardly, an adhesive tape was attached to one end of the separator from therebelow, and pulled to peel the separator while checking whether the polarizing plate drops from the suction stage. The suction force with respect to the polarizing plate can be adjusted by a suction power (pump speed) of the vacuum pump 305. In this test, it was set to 45 KPa. In Comparative Example A, the suction force of the suction fixing device 300 was set to 70 KPa. A comparative test was also performed as Comparative Example A'.

A result of the above test is presented in Table 4.

dropping is probably because a thinned polarizing film has low rigidity, and thereby the peel force is more likely to be transmitted to the polarizing film. Thus, in a thinned polarizing film, if an adhesive requiring a high peel force of the separator is employed, dropping of the polarizing film is more likely to occur, thereby causing difficulty in performing the operation of peeling off the separator from the polarizing film.

In Comparative Example A', although the adhesive layer has an adhesive force set to allow the peel force of the separator with respect to the adhesive layer to become 0.14 N/50 mm-width, the suction force of the suction fixing device 300 with respect to the polarizing film is as high as 70 KPa, and thereby it is possible to prevent the polarizing plate from dropping from the suction fixing device. However, as a result of visual observation of the polarizing film

TABLE 4

|  | Test Conditions (Abstract) | Thickness of polarizing film (μm) | Separator peel force (N/50 mm-width) | Advesive force to glass plate (N/25 mm-width) | Inspectipon of Lamination |
| --- | --- | --- | --- | --- | --- |
| Inventive Example A | Peeling and re-laminating separator | 50 | 0.03 | 3.5 | Successfully Laminated |
| Inventive Example B | After pealing and re-laminating separator, storing the separator for one month | 50 | 0.06 | 3.8 | Successfully Laminated |
| Inventive Example C | After pealing and re-laminating separator, storing the separator for 3 months | 50 | 0.08 | 4 | Successfully Laminated |
| Inventive Example D | Peeling and re-laminating separator | 80 | 0.03 | 3.5 | Successfully Laminated |
| Inventive Example E | Reducing amount of peroxide of pressure-sensitive adhesive to 0.2 parts | 50 | 0.08 | 3.4 | Successfully Laminated |
| Inventive Example F | Reducing amount of peroxide of pressure-sensitive adhesive to 0.17 parts | 50 | 0.1 | 3.4 | Successfully Laminated |
| Comparative Example A | — | 50 | 0.14 | 3.5 | Dropped from suction fixing device |
| Comparative Example B | — | 80 | 0.14 | 3.5 | Dropped from suction fixing device |
| Comparative Example A' | Setting suction force to 70 Kpa | 50 | 0.14 | 3.5 | No dropped from suction fixing device, but occurrence of suction mark |

As presented in Table 4, in Inventive Examples A to F, the separator could be peeled off from the polarizing film without causing the polarizing film to drop from the suction stage. As a result of visually checking the polarizing film after peel-off of the separator, no suction mark was observed on the polarizing film. In Inventive Examples A to F, the adhesive layer has an adhesive force set to allow a peel force of the separator with respect to the adhesive layer to become 0.10 N/50 mm-width or less. Thus, as long as the adhesive force is set to allow the peel force to become 0.10 N/50 mm-width or less, the separator can be peeled without any problem even in a thinned polarizing film having a thickness of 90 μm or less, e.g., 80 μm or 50 μm.

On the other hand, in the test result of Comparative Examples A and B, the separator undesirably dropped from the suction stage during the operation of peeling off the separator from the polarizing film. In Comparative Examples A and B, the adhesive layer has an adhesive force set to allow the peel force of the separator with respect to the adhesive layer to become 0.14 N/50 mm-width. Thus, as compared to the Inventive Examples, a stronger peel force is required. It is considered that this strong peel force is applied to the polarizing film via the separator and the adhesive layer, thereby causing the polarizing film from dropping from the suction stage. Another reason for the after peel-off of the separator, a suction mark was observed in the polarizing film. If such a suction mark is included in a liquid crystal display, the liquid crystal display fails to adequately display an image. Thus, any polarizing film having a suction mark cannot be used in a product. Therefore, in order to allow the separator to be peeled without causing dropping of the polarizing film even in a situation where the suction force of the suction fixing device is set to a small value enough to avoid the occurrence of a suction mark, it is necessary to reduce a peel force of the separator with respect to the polarizing film.

Preferably, the adhesive force of the adhesive layer with respect to a glass plate is set to 2.0 to 5.0 N/25 mm-width. If the adhesive force is less than 2.0 N/25 mm-width, there is a possibility of the occurrence of a problem that the polarizing film peels from a liquid crystal display panel (glass plate). For example, when the polarizing film is subjected to a heating durability test in which it is put into an oven at 85° C. for 500 hours, the polarizing film undergoes contraction by heating. Thus, if the adhesive force is less than 2.0 N/25 mm-width, there is a possibility of the occurrence of a problem that the polarizing film peels from the glass plate. On the other hand, if the adhesive force is greater than 5.0 N/25 mm-width, when it is necessary to peel the polarizing film laminated to a liquid crystal cell, for example, in the case where the polarizing film is damaged, there is a possibility of the occurrence of a problem that the polarizing film is broken to preclude peeling (preclude reworking).

In fact, in Inventive Examples A to F and Comparative Examples A and B, wherein the adhesive force of the adhesive layer with respect to a glass plate is set to 2.0 N/25 mm-width or more, the problem of peeling of the polarizing film from the glass plate never occurred even in the heating durability test. In Inventive Examples A to F and Comparative Examples A and B, wherein the adhesive force of the adhesive layer with respect to a glass plate is set to 5.0 N/25 mm-width or less, the polarizing film could be peeled off from a liquid crystal cell. Thus, the adhesive layer in each of the Inventive and Comparative Examples has an adequate adhesive force with respect to a glass plate.

The above test result shows that, as long as the adhesive layer has an adhesive force set to allow a peel force of the separator with respect to the adhesive layer to become 0.10 N/50 mm-width or less, the separator can be peeled off without causing the dropping, even in the situation where a thinned polarizing film is fixed to the stage by a small suction force enough to avoid the occurrence of a suction mark. Such an effect can be obtained not only in Inventive Examples A to F but also in various optical laminates as long as they satisfy the following condition: a peel force of a separator with respect to a polarizing film is 0.10 N/50 mm-width or less. For example, Inventive Examples 3, 5, 6, 13 and 14 have the same effect, because they satisfy the following condition: a peel force of a separator with respect to a polarizing film is 0.10 N/50 mm-width or less. The optical film laminate having the above effect can be prepared by laminating together an adhesive layer and a polarizing film which are produced by a separator-attached adhesive layer structure production method comprising: a first step of forming a layer of an adhesive composition containing a (meth)acryl-based polymer, a peroxide and a phenolic antioxidant, on a release treatment surface of a separator subjected to a release treatment; and a second step of, after completion of the first step, heating the adhesive composition to cause cross-linking therein so as to be formed as an adhesive layer.

LIST OF REFERENCE SIGNS

100: peel test-dedicated jig
101: metal plate
102: clip
200: peel tester
201: upper unit of peel tester
202: lower unit of peel tester
210: leading tape
220: sample of polarizing plate
221: separator
222: region of polarizing plate from which separator had been peeled
300: suction fixing device
301: suction stage
302: suction port
303: air passage
304: air pipe
305: vacuum pump
310: sample of polarizing plate

The invention claimed is:

1. An optical laminate comprising:
a polarizing film comprising a polarizer film;
an adhesive layer laminated to a surface of the polarizer film; and
a separator attached to the adhesive layer,
wherein
the adhesive layer contains a (meth)acryl-based polymer, a peroxide in an amount of 0.17 to 0.8 weight parts, with respect to 100 weight parts of the (meth)acryl-based polymer, and a phenolic antioxidant in an amount of 0.05 to 3 weight parts, with respect to 100 weight parts of the (meth)acryl-based polymer, and
the polarizing film has a thickness of 90 μm or less, and the adhesive layer has an adhesive force set to allow a peel force of the separator with respect to the adhesive layer attached to the surface of the polarizing film to be 0.10 N/50 mm-width or less.

2. The optical laminate as recited in claim 1, wherein the adhesive layer has a peel force set to allow a peel force of the polarizing film with respect to glass to fall within a range of 2.0 to 5.0 N/25 mm-width.

3. The optical laminate as recited in claim 1, wherein the adhesive layer contains the peroxide in an amount of 0.17 to 0.30 weight parts, with respect to 100 weight parts of the (meth)acryl-based polymer.

4. The optical laminate as recited in claim 1, wherein the polarizing film further comprises a brightness enhancing film.

5. The optical laminate as recited in claim 1, wherein the adhesive layer has an adhesive force to allow the peel force of the separator with respect to the adhesive layer attached to the surface of the polarizing film to be 0.08 N/50 mm-width or less.

6. The optical laminate as recited in claim 1, wherein the adhesive layer has an adhesive force to allow the peel force of the separator with respect to the adhesive layer attached to the surface of the polarizing film to be 0.06 N/50 mm-width or less.

7. The optical laminate as recited in claim 1, wherein the polarizing film further comprises a protective film.

8. The optical laminate as recited in claim 1, wherein the optical laminate is designed to be used in a state in which the optical laminate is attached to a liquid crystal cell.

9. The optical laminate as recited in claim 1, wherein a thickness of the separator is 5 to 200 μm.

10. The optical laminate as recited in claim 1, wherein the separator is subjected to a release treatment that includes one or more of a silicone treatment, a long-chain alkyl treatment or a fluorine treatment.

* * * * *